US012077685B2

(12) United States Patent
Williams et al.

(10) Patent No.: US 12,077,685 B2
(45) Date of Patent: Sep. 3, 2024

(54) BEARINGS AND COMPONENTS THEREOF COMPRISING A HOT-MELT PRESSURE SENSITIVE ADHESIVE AND METHODS OF THEIR PREPARATION

(71) Applicant: Nautilus Solutions, LLC, Thorofare, NJ (US)

(72) Inventors: Charles Terrell Williams, Bristol, PA (US); Edward Ewart La Fleur, Holland, PA (US)

(73) Assignee: Nautilus Solutions, LLC, Thorofare, NJ (US)

( * ) Notice: Subject to any disclaimer, the term of this patent is extended or adjusted under 35 U.S.C. 154(b) by 0 days.

(21) Appl. No.: 17/960,122

(22) Filed: Oct. 4, 2022

(65) Prior Publication Data
US 2023/0040716 A1 Feb. 9, 2023

Related U.S. Application Data

(62) Division of application No. 17/199,845, filed on Mar. 12, 2021, now Pat. No. 11,499,076.
(Continued)

(51) Int. Cl.
*B32B 7/12* (2006.01)
*B32B 15/085* (2006.01)
(Continued)

(52) U.S. Cl.
CPC ............... *C09J 179/02* (2013.01); *B32B 7/12* (2013.01); *B32B 15/085* (2013.01); *B32B 15/18* (2013.01);
(Continued)

(58) Field of Classification Search
CPC ........ C09J 179/02; B32B 7/12; B32B 15/085; B32B 15/18; B32B 27/322; B32B 37/12;
(Continued)

(56) References Cited

U.S. PATENT DOCUMENTS

| 4,867,889 A | 9/1989 | Jacobson |
| 9,320,826 B2 | 4/2016 | Lee et al. |

(Continued)

FOREIGN PATENT DOCUMENTS

| CN | 104672396 B | 6/2017 |
| CN | 105709607 B | 5/2018 |

(Continued)

OTHER PUBLICATIONS

PCT/US23/14975 International Search Report and Written Opinion mailed Jun. 23, 2023, Applicant: Nautilus Solutions, LLC, 24 pgs.
(Continued)

*Primary Examiner* — Vishal I Patel
(74) *Attorney, Agent, or Firm* — Hoffmann & Baron, LLP

(57) ABSTRACT

Methods of making bearings using pressure sensitive macromolecular adhesive polymers and pressure sensitive polymer compositions capable of integrating fluoropolymeric properties with a catecholamine functionality to form an adhesive system that allows bonding between metallic substrates and fluoropolymers are disclosed. Also disclosed are core-shell polymeric particles comprised of a core and a shell comprising a thermoplastic polydopamine polymer that may be prepared as a colloidal suspension and used as a hot-melt pressure sensitive adhesive capable of binding low surface energy materials, such as polyolefins and fluoropolymers, to diverse materials including metals in making bearings and/or bearing components.

7 Claims, 16 Drawing Sheets

Related U.S. Application Data

(60) Provisional application No. 62/989,553, filed on Mar. 13, 2020.

(51) Int. Cl.
  *B32B 15/18* (2006.01)
  *B32B 27/32* (2006.01)
  *B32B 37/12* (2006.01)
  *B32B 37/18* (2006.01)
  *C09J 179/02* (2006.01)
  *F16C 33/20* (2006.01)

(52) U.S. Cl.
  CPC ............ *B32B 27/322* (2013.01); *B32B 37/12* (2013.01); *B32B 37/182* (2013.01); *F16C 33/201* (2013.01); *B32B 2255/10* (2013.01); *B32B 2255/26* (2013.01); *B32B 2307/746* (2013.01); *B32B 2311/30* (2013.01); *B32B 2327/18* (2013.01); *B32B 2475/00* (2013.01)

(58) Field of Classification Search
  CPC .............. B32B 37/182; B32B 2255/10; B32B 2255/26; B32B 2307/746; B32B 2311/30; B32B 2327/18; B32B 2475/00; F16C 33/201
  See application file for complete search history.

(56) References Cited

U.S. PATENT DOCUMENTS

| | | |
|---|---|---|
| 9,765,818 B2 | 9/2017 | Astner et al. |
| 9,770,418 B2 | 9/2017 | Rahimipour et al. |
| 9,943,487 B2 | 4/2018 | White et al. |
| 10,119,567 B2 | 11/2018 | Hardgrave et al. |
| 10,294,567 B2 | 5/2019 | Ma et al. |
| 10,723,899 B2 | 7/2020 | Kohri et al. |
| 10,945,953 B1 | 3/2021 | Moaseri |
| 11,499,076 B2 | 11/2022 | Williams et al. |
| 2009/0052822 A1 | 2/2009 | Hardgrave et al. |
| 2011/0262064 A1 | 10/2011 | Burgeff et al. |
| 2012/0275731 A1 | 11/2012 | Ziegler et al. |
| 2013/0192743 A1 | 8/2013 | Wohlfeil et al. |
| 2014/0011912 A1 | 1/2014 | Petry et al. |
| 2014/0271774 A1 | 9/2014 | Drumheller et al. |
| 2015/0010709 A1 | 1/2015 | Beckford et al. |
| 2017/0095558 A1 | 4/2017 | Xu et al. |
| 2017/0247631 A1 | 8/2017 | Kim et al. |
| 2018/0134917 A1 | 5/2018 | Mekhilef et al. |
| 2018/0355271 A1 | 12/2018 | Kim |
| 2019/0008965 A1 | 1/2019 | Messersmith et al. |
| 2019/0079014 A1 | 3/2019 | Duan et al. |
| 2019/0203771 A1 | 7/2019 | Jaeger |
| 2019/0273287 A1 | 9/2019 | Merlo et al. |
| 2020/0200219 A1* | 6/2020 | Zhang ...................... B32B 27/18 |
| 2021/0115238 A1* | 4/2021 | Williams ............. C08G 73/026 |
| 2021/0284887 A1 | 9/2021 | Williams et al. |

FOREIGN PATENT DOCUMENTS

| | | |
|---|---|---|
| CN | 110317558 A | 10/2019 |
| EP | 4048732 A1 | 8/2022 |
| WO | 2012125693 A2 | 9/2012 |
| WO | 2014118266 A1 | 8/2014 |
| WO | 2014132012 A1 | 9/2014 |
| WO | 2015068503 A1 | 5/2015 |

OTHER PUBLICATIONS

Anderson, et al., Oxidation of 3,4-Dihydroxyphenylacetaldehyde, a Toxic Dopaminergic Metabolite, to a Semiquinone Radical and an ortho-Quinone, The Journal of Biological Chemistry, vol. 286, No. 30, pp. 26978-26986, Jul. 29, 2011, 10 pages.

Bai, et al., Synthesis of a diamine cross-linker containing Diels-Alder . . . epoxy monomer, Polymer Chemistry, 2013, 4, pp. 724-730, 7 pages.

Ball, Polydopamine Nanomaterials: Recent Advances in Synthesis Methods and Applications, Frontiers in Bioengineering and Biotechnology, Aug. 17, 2018, vol. 6, Article 109, 12 pages.

Barua, et al., Biocompatible high performance hyperbranched epoxy/clay nanocomposite as an implantable material, Biomed. Mater. 9 (2014) 025006, 15 pages.

Batul, et al., Synthesis of Polydopamine Nanoparticles for Drug Delivery Applications, Microscopy and microanalysis, Aug. 2018, 3 pages.

Coskun, et al., Biofunctionalized conductive polymers enable efficient $CO_2$ electroreduction, Sci. Adv. 2017; 3:e1700686, Aug. 4, 2017, 9 pages.

Ding, et al., Mussel-inspired polydopamine for bio-surface functionalization, Biosurf Biotribol, Dec. 2016, 121-136, 25 pages.

Dreyer, et al., Elucidating the Structure of Poly(dopamine), Langmuir 2012, 28, 6428-6435, 8 pages.

Garcia, et al., Recyclable, Strong Thermosets and Organogels via Paraformaldehyde Condensation with Diamines, Science, vol. 344, May 16, 2014, 5 pages.

Gazzotti, et al., One-Pot Synthesis of Sustainable High-Performance Thermoset by Exploiting Eugenol Functionalized 1, 3-Dioxolan-4-one, ACS Sustainable Chem. Eng. 2018, 6, pp. 15201-15211, 11 pages.

Hamlin, et al., Toward a Unified Mechanism for Oxoammonium Salt-Mediated Oxidation Reactions: A Theoretical and Experimental Study Using a Hydride Transfer Model, J. Org. Chem. 2015, 80, 8150-8167, 18 pages.

Higginson, et al., Supporting Information, Bioinspired Design Provides High-Strength Benzoxazine Structural Adhesives, Angewandte Chemie, 2019, 121 pages.

Higginson, et al., Bioinspired Design Provides High-Strength Benzoxazine Structural Adhesives, Angew. Chem. Int. Ed. 2019, 58, pp. 12271-12279, 9 pages.

Hu, et al., Investigation of Dopamine Analogues: Synthesis, Mechanistic Understanding, and Structure-Property Relationship, 201 American Chemical Society, Langmuir 2016, 32, 9873-9882, 10 pages.

Kang, et al., Core-Shell Polymeric Microcapsules with Superior Thermal and Solvent Stability, ACS Appl. Mater. Interfaces 2015, 7, pp. 10952-10956, 5 pages.

Kasemset et al., Effect of polydopamine deposition conditions on fouling resistance, physical properties, and permeation properties of reverse osmosis membranes in oil/water separation, Journal of Membrane Science 425-426 (2013) 208-216, 9 pages.

Koh, et al., Fracture Toughness and Elastic Modulus of Epoxy-Based Nanocomposites with Dopamine-Modified Nano-Fillers, Materials 2017, 10, 776, www.mdpi.com/journall/materials, 16 pages.

Lee, et al., Mussel-Inspired Surface Chemistry for Multifunctional Coatings, Science 318, 426 (2007), 6 pages.

Liu, et al., Polydopamine and Its Derivative Materials: Synthesis and Promising Applications in Energy, Environmental, and Biomedical Fields, Chem. Rev. 2014, 114, 5057-5115, 59 pages.

Makuraza, et al., Vibrational and Electronic Spectra of Natural Dyes Constituents for Solar Cell Application: DFT and TDDFT Study, International Journal of Materials Science and Applications 2015; 4(5): 314-324, 11 pages.

Miller, Dissertation, Assessment of Fouling in Native and Surface-Modified Water Purification Membranes, The University of Texas at Austin, May 2013, 421 pages.

Mrowczynski, et al., Chemistry of Polydopamine Analogues, Polymer International, Jul. 2016, 13 pages.

Nishida, et al., Potential of Oxidative polymerization coating of cellulose nano-fiber by dopamine, IOP Conference Series: Materials Science and Engineering 368 (2018) 012043, 12 pages.

Pct, Invitation to Pay Additional Fees and, Where Applicable, Protest Fee, for International Application No. PCT/US20/56543, 25 pages.

pDA Kinetics, GGB Bearing Technology, 3 pages.

Ryu, et al., Polydopamine Surface Chemistry: A Decade of Discovery, ACS Appl. Mater Interfaces. Mar. 2018 207; 10(9): 7523-7540, 37 pages.

(56) References Cited

OTHER PUBLICATIONS

Salomaki, et al., Effects of pH and Oxidants on the First Steps of Polydopamine Formation: A Thermodynamic Approach, J. Phys. Chem. B 2018, 122, pp. 6314-6327, 14 pages.
Solano, Melanin and Melanin-Related Polymers as Materials with Biomedical and Biotechnological Applications-Cuttlefish Ink and Mussel Foot Proteins as Inspired Biomolecules, Int. J. Mol. Sci. 2017, 18, 1561, 18 pages.
Spiegel, Special Issue: Recent Advances in Applied Polymer Science, J. Appl. Polym. Sci. 2018, 33 pages.
Uysal, et al., Synthesis and characterization of dopamine substitute tripodal trinuclear [(salen/salophen/salpropen)M] (M=CR(III), Mn(III), Fe(III) ions) capped s-triazine complexes: Investigation of their thermal and magnetic properties, Journal of Molecular Structure 1109 (2016) pp. 119-126, 8 pages.
Wacker, et al., Harnessing the Chemical Diversity of the Natural Product Magnolol . . . Antioxidant Activity, Biomacromolecules 2019, 20, pp. 109-117, 9 pages.
Watanabe, et al., Surface texturing of natural 'urushi' thermosetting polymer thin films, Polymer Journal (2014) 46, pp. 216-219, 4 pages.
Zhao, et al., Dopamine-Mediated Pre-Crosslinked Cellulose/Polyurethane Block Elastomer for the Preparation of Robust Biocomposites, ACS Omega 2018, 3, pp. 10657-1067, 11 pages.
PCT/US2020/056543 International Search Report and Written Opinion mailed Mar. 31, 2021, 12 pages.
Tokura et al. "Fabrication of Defined Polydopamine Nanostructures by DNA Origami-Templated Polymerization," Angewandte Chemie International Edition, vol. 57, Jan. 29, 2018, pp. 1587-1591.
Tokura et al. "Supporting Information: Fabrication of Defined Polydopamine Nanostructures by DNA Origami-Templated Polymerization," Angewandte Chemie International Edition, vol. 57, Jan. 29, 2018, 17 pgs.
PCT/US2021/022078 International Search Report and Written Opinion mailed May 7, 2021, 14 pages total.
Lee et al. "Mussel-Inspired Surface Chemistry for Multifunctional Coatings," National Institutes of Health-Author Manuscript, Dec. 12, 2008, 10 pgs.
Jeffrey Norris, "Fetal surgery stands to advance from new glues inspired by mussels," Berkeley News, Jun. 30, 2016, downloaded from https://news.berkeley.edu/2016/06/30/fetal-surgery-stands-to-advance-from-new- glues-inspired-by-mussels/, 6 pgs.
Messersmith Research Group, Youtube video from UC Berkeley News about "Mussels inspire surgical glue Invention," website: https://bioinspiredmaterials.berkeley.edu/, 5 pgs.
Messersmith Research Group, "Mussel-Inspired Adhesives," downloaded on Jan. 4, 2022 from https://bioinspiredmaterials.berkeley.edu/research/mussel-inspired-adhesives/, 3 pgs.
GGB, "DP4 and DP4-B Metal-Polymer Self-Lubricating Lead Free Bearing Solutions," Brochure downloaded on Jan. 4, 2022 from https://www.ggbearings.com/sites/default/files/2021-12/GGB-DP4-and-DP4-B-Metal-Polymer-Self-Lubricating-Lead-Free-Bearing-Solutions-Brochure-English.pdf, 56 pgs.
Min Zhang, et al., "Preparation of IDA-Cu functionalized core saellite Fe3O4/polydopamine/Au magnetic nanocomposites and thier application for depletion of abundant protein in bovine blood", Journal of Materials Chemisrty, vol. 20, No. 47, Jan. 1, 2010 (Jan. 1, 2010), p. 10696-10704, XP055037168, ISSN: 0959-9428, DOI: 10.1039/c0jm01366f.
Harwood, "Electron Exchange Polymers. IX. Synthesis of Polymers of 2, 5-Dihydroxypenylalanine and of 3, 4-Dihydroxypenylalanine", J. Am. Chem. Soc. 1957, 79, 16, 4360-4365 (Year: 1957).
EP 20879940.3 Partial European Search Report mailed Oct. 2, 2023, 21 pgs.
Ma, "pH-Responsive Controlled-Release Fertilizer with Water Retention via Atom Transfer Radical Polymerization of Acrylic Acid on Mussel-Inspired Initiator", J. Agric. Food. Chem. 2013, 61, 5474-5482 (Year: 2013).
EP20879940.3—Extended European Search Report mailed Jan. 8, 2024, 16 pgs. total.
EP21768701.1—Extended European Search Report mailed Feb. 26, 2024, 14 pgs. total.

\* cited by examiner

FT IR spectra for Tapes and cured coatings of the colloidal disperson

BEARINGS AND COMPONENTS THEREOF COMPRISING A HOT-MELT PRESSURE SENSITIVE ADHESIVE AND METHODS OF THEIR PREPARATION

CROSS-REFERENCE TO RELATED APPLICATIONS

This application is a divisional of U.S. patent application Ser. No. 17/199,845, filed Mar. 12, 2021, which claims the benefit of U.S. Provisional Patent Application No. 62/989,553, filed Mar. 13, 2020, which is incorporated by reference in its entirety.

FIELD

The present disclosure relates to methods of preparing bearings, bearing surfaces, and bearing components comprising a coating or layer of a thermoplastic hot melt pressure sensitive adhesive capable of bonding to diverse materials including those with low surface energy such as fluoropolymers used to reduce friction in bearings. The adhesive comprises polydopamine polymers having catechol-amine functionalities incorporated into an adhesive system that allows bonding between substrates (surfaces of articles) including metallic materials and low surface energy materials (e.g., fluoropolymers or their composites such as polyimide fluoropolymer composites). The disclosure also relates to the application of core-shell colloidal polymeric materials that function as hot-melt pressure sensitive adhesives (e.g., for interfacial bonding of materials including fluoropolymers and/or composites comprising fluoropolymers) in methods of making bearing and bearing components.

BACKGROUND

Bearings may have tribological components that provide surface(s) (tribological surfaces) with suitable friction control (i.e., increased or reduced friction), lubrication, and wear resistance made from, for example, metals (e.g., babbit) and polymeric materials (e.g., fluoropolymers). Such tribological components comprise a tribological material, for example, in the form of a polymeric coating or film, and may further comprise a substrate that acts as a structural support (e.g., structural metal or structural polymer support/backing). The substrate may provide strength, rigidity, and/or allow the tribological material, particularly polymer-based tribological materials, to be held/formed into an appropriate shape, such as a cylinder thereby providing an appropriately configured surface with suitable levels of friction, lubrication, and/or wear resistance. Where such components comprise two materials such as a metallic substrate and polymeric tribological material, they must be bonded in a manner that withstands the thermal, mechanical and wear (abrasive) conditions inherent to the circumstances in which the bearing is employed. The metal-polymer, metal-metal, or polymer-polymer interlayer that provides such bonding is often a critical part of providing the appropriate load bearing and tribological characteristics. In some cases, tribological materials have been impregnated into sintered materials such as sintered bronze etc., however, such bonding techniques are not compatible with all substrates and tribological materials, and are inefficient, particularly where the substrate and or tribological material is a low surface energy material such as a fluoropolymer. Accordingly, there is a need for adhesives that allow bonding between bearing substrates and tribological materials such as fluoropolymers used in mechanical bearings to reduce friction.

A close look at the naturally occurring phenomena exhibited by mussels, which adhere to the surface of metallic and non-metallic substrates, reveals the possibility of leveraging their biological mechanism of adhesion to promote the effective coupling of metallic and organic functional groups in difficult and non-compatible systems. One aspect of the present disclosure, which is inspired by natural phenomena, is directed to pressure sensitive macromolecular adhesive polymers having catechol-amine functionalities that can bind low surface energy materials, such as fluoropolymer, as an adhesive system. Such systems could allow bonding between diverse substrates including metallic substrates and low energy polyolefins or fluoropolymers or their composites including those used in tribological applications.

SUMMARY

This disclosure describes, among other things, novel methods of forming adhesive interfaces using hot-melt dopamine-based thermoplastic polymers (polydopamine polymers) that bond together mechanical bearing elements such as those providing support (e.g., substrates providing structural support) for a tribological material and tribological materials used in bearings (e.g., polyolefins and fluorinated polymers such as fluorinated polyolefins such as PTFE). Polydopamine polymers may be prepared by an in situ polymerization reaction of dopamine in the presence of one or more carboxylic acid(s). The polymerization reaction may be conducted in the presence of materials (e.g., in the form of particles, tubes, sheets or films) onto which dopamine-based polymers can be deposited and/or grafted, depending on the nature of the materials, forming a partial or complete layer on the surface(s) of the materials.

One aspect of this disclosure is directed to a method of preparing a dopamine-based thermoplastic polymer, the method comprising contacting dopamine and/or dopamine analogs with one or more carboxylic acids in the presence of a redox initiator (such as elemental oxygen) that oxidizes all or part of the dopamine or dopamine analogs to quinol or semiquinones. The reaction may be carried out in a basic aqueous buffer solution (such as a tris-(hydroxymethyl) aminomethane buffered solution) optionally comprising a water miscible organic solvent such as an alcohol or ketone; the reaction forming a polymer comprising polymerized monomers of dopamine quinone, semiquinone, semiquinone ester, quinol, and/or quinol esters of the dopamine and/or dopamine analogs. Another aspect of this disclosure relates to the product formed by such a process.

A portion of this disclosure is directed to core-shell particles having a shell of dopamine-based thermoplastic polymer and their application to a surface of a tribological material to be used as an interface with a bearing material in the formation of a bearing component. The core-shell particles are produced by the introduction of particles into a reaction mixture in which the polymerization of dopamine and/or dopamine analogs occurs, where the particles function as a core upon which a shell layer of dopamine-based thermoplastic polymer becomes deposited (the polydopamine polymer forms a shell on the particle which serves as a core). Thermoplastic shell layers of polydopamine polymers can be formed upon a variety of core materials including, but not limited to, inorganic materials (e.g., metal or metalloid oxides) or core polymers (also referred to as core polymeric materials, e.g., either non-fluorinated or fluorinated thermoset plastics, or non-fluorinated or non-fluorinated thermoplastics). Core polymers include, but are not limited to, materials such as vinylidene fluoride polymers or copolymers, vinyl chloride copolymers, and polytetrafluoroethylene (PTFE) in the form of sheets or particles. Solution-phase polymerization of dopamine in the presence of one or more types of core particles can result in the formation of a suspension (e.g., colloidal suspension) of core particles with a shell layer of dopamine-derived polymer deposited, partially grafted, or fully grafted on the particles' surfaces. The composite core-shell polymer particles may be designed to function as hot-melt pressure sensitive adhesive compositions for coupling bearing interfaces or surfaces including, among other things, low surface energy polymeric substrates such as PTFE and/or polyolefin with high surface energy metallic surfaces.

The core of a core-shell particle may constitute about 45% to about 90% of the total weight of the core-shell particle, and the shell about 10% to about 55% of the total weight of the particle on a dry weight basis. Dopamine and/or dopamine analogs may constitute up to about 70% (e.g. from 20%-35%, 35%-50%, 50%-60%, or 60%-70%) of the weight of the shell on a dry weight basis.

The disclosure also describes core-shell particles and suspensions of core-shell particles comprising a core and a shell, wherein: a) the core is comprised of about 45 percent to about 100 percent of core polymer material on a dry weight basis; and b) the shell is comprised of about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent of the polymer forming the shell may be grafted (covalently bound) to the polymer forming the core (e.g., covalently bound to the backbone of the core polymer material).

An aspect of the disclosure is directed to core-shell particles having a core particle that is comprised of a) about 90 to about 95 percent of one or more polymerized olefins (e.g., vinyl monomers and/or fluorinated olefin monomers such as in a PTFE core particle) on a dry weight basis, and b) up to about 10 percent of divinyl, trivinyl or tetravinyl monomers (e.g., allyl methacrylate, ethylene glycol dimethacrylate or trimethylolpropane trimethylate), or a mixture thereof, on a dry weight basis; and a shell that comprises about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent (e.g., from 0 to 10, from 10 to 30, from 30 to 60, from 60 to 80 or from 80 to 100 percent) of the polymer forming the shell may be grafted (covalently bound) to the polymer forming the core (e.g., covalently bound to the backbone of the core polymer material).

Another aspect of the disclosure is directed to core-shell particles having a core particle that is comprised of a) about 70 to about 100 percent of one or more polymerized olefins (e.g., vinyl monomers and/or fluorinated olefin monomers such as in a PTFE core particle) on a dry weight basis, and b) up to about 30 percent of divinyl, trivinyl or tetravinyl monomers (e.g., allyl methacrylate, ethylene glycol dimethacrylate or trimethylopropane trimethylate), or a mixture thereof, on a dry weight basis; and a shell that comprises about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent (e.g., from 0 to 10, from 10 to 30, from 30 to 60, from 60 to 80 or from 80 to 100 percent) of the polymer forming the shell may be grafted (covalently bound) to the polymer forming the core (e.g., covalently bound to the backbone of the core polymer material).

The core particle may comprise a polymeric material (a "core polymer") that comprises, consists essentially of, or consists of a thermoplastic particle, such as a thermoplastic fluoropolymer (e.g., polytetrafluoroethylene (PTFE)) particle. In such embodiments, the core polymer material may have a glass transition temperature ranging from $-103°$ C. to $200°$ C. (e.g., $-103°$ C. to $-50°$ C., $-50°$ C. to $0°$ C., $0°$ C. to $50°$ C., $50°$ C. to $100°$ C., $100°$ C. to $150°$ C., or $150°$ C. to $200°$ C.).

The shell may comprise dopamine HCl monomers polymerized with (in the presence of) one or more carboxylic acids and/or one or more carboxylic acid anhydrides to form a shell polymer. The shell polymer of a core-shell particle may also comprise a polydopamine polymer that is a copolymer or heteropolymer comprising dopamine analogue.

The polydopamine polymers forming the shell may be partially or fully grafted onto the core or core polymer thereby forming covalent attachments between the core and shell of the core-shell polymeric particles.

The particle size distribution of the core-shell polymeric particles may be bimodal or multimodal. In an embodiment the distribution is bimodal and the diameter measurement of the core-shell polymeric particles has a peak in the range of 0.01 µm to 0.5 µm, and a peak in the range of 0.5 µm to 1.0 µm.

This disclosure also describes hot-melt pressure sensitive adhesive coatings comprising core-shell polymeric particles. Such pressure sensitive adhesives comprising core-shell particles can function to join the surfaces of various materials such as metals and low surface energy polymers (e.g., PTFE, expanded-PTFE, FEP or expanded-FEP) under mechanically abrasive environments at temperatures ranging from ambient (about $20°$ C.) to $360°$ C. (e.g., from $200°$ C. to $300°$ C., from $230°$ C. to $330°$ C., or from $300°$ C. to $350°$ C.), and/or pressures ranging from sub-atmospheric (e.g., 0.1 Pa (or less)) to 22 MPa (e.g., less than 0.1 Pa, 0.1 Pa to 100 Pa, 100 Pa to 100,000 Pa, 0.1 MPa to 1 MPa, or 1 MPa to 22 MPa), where "Pa" is a Pascal and MPa is a mega Pascal.

Also described herein are methods of making polydopamine polymers (e.g., esterified polydopamine polymers) and the use of such polymers as primers and/or adhesives between diverse materials including polymers (thermoset and/or thermoplastic polymers), metals, glasses, ceramics, metal oxides, metalloid oxides and the like. The polydopamine polymers and core-shell particles comprising a shell of polydopamine polymer find particular application as an adhesive in demanding applications including, but not limited to, the manufacture of bearings and tribological materials where plastic/polymeric components (e.g., fluoropolymer and perfluoropolymers) need to be secured to other materials including metals or metal alloys). The polydopamine polymers and core-shell particles comprising a shell of polydopamine polymer may also be used to secure plastics and polymers to metals and other surfaces in applications such as wire/conductive surface insulation (e.g., polyimide-fluoropolymer composites).

A portion of this disclosure is directed to mechanical bearings comprising: a substrate bonded to a tribological material by an adhesive comprising hot-melt pressure-sensitive core-shell polymeric particles; wherein the hot-melt pressure-sensitive core-shell polymeric particles comprise a core and a shell; wherein the adhesive is comprised of up to about 95% by weight of the core-shell polymeric particles based on the weight of the adhesive; and wherein
   a. the core comprises a polymeric particle comprised of one or more polymers or the core is an inorganic particle comprised of one or more non-metallic inorganic materials,
   b. the shell comprises a thermoplastic polydopamine polymer comprised of dopamine and/or dopamine analog monomers polymerized with one or more carboxylic acids, and
   c. 0 to 100 percent (e.g., from 5%-10%, from 10%-25%, from 25%-50%, from 50%-75% or 75%-100%) of the shell polydopamine polymer is grafted onto the core.

A portion of this disclosure is directed to methods associated with the use of thermoplastic polydopamine polymers and core-shell particles having a shell of such particles as adhesives in the preparation of mechanical bearings. Accordingly, the disclosure provides methods of forming mechanical bearings or bearing components comprising a substrate bonded to a tribological material by an adhesive comprising hot-melt pressure-sensitive core-shell polymeric particles, the method comprising applying a composition comprising the core-shell particle to all or part of the substrate and/or tribological material and contacting the substrate with the tribological material at a point where the composition has been applied. The disclosure also provides methods of preparing adhesive tribological materials, comprising applying a composition comprising core-shell particles (e.g., an aqueous composition) to all or part of the tribological material and optionally heating the tribological material. Methods of coating all or part of a bearing's substrate or a tribological material with an adhesive comprising hot-melt pressure-sensitive core-shell polymeric particles are also disclosed and provided for.

DETAILED DESCRIPTION

I. Definitions

Figure 1:
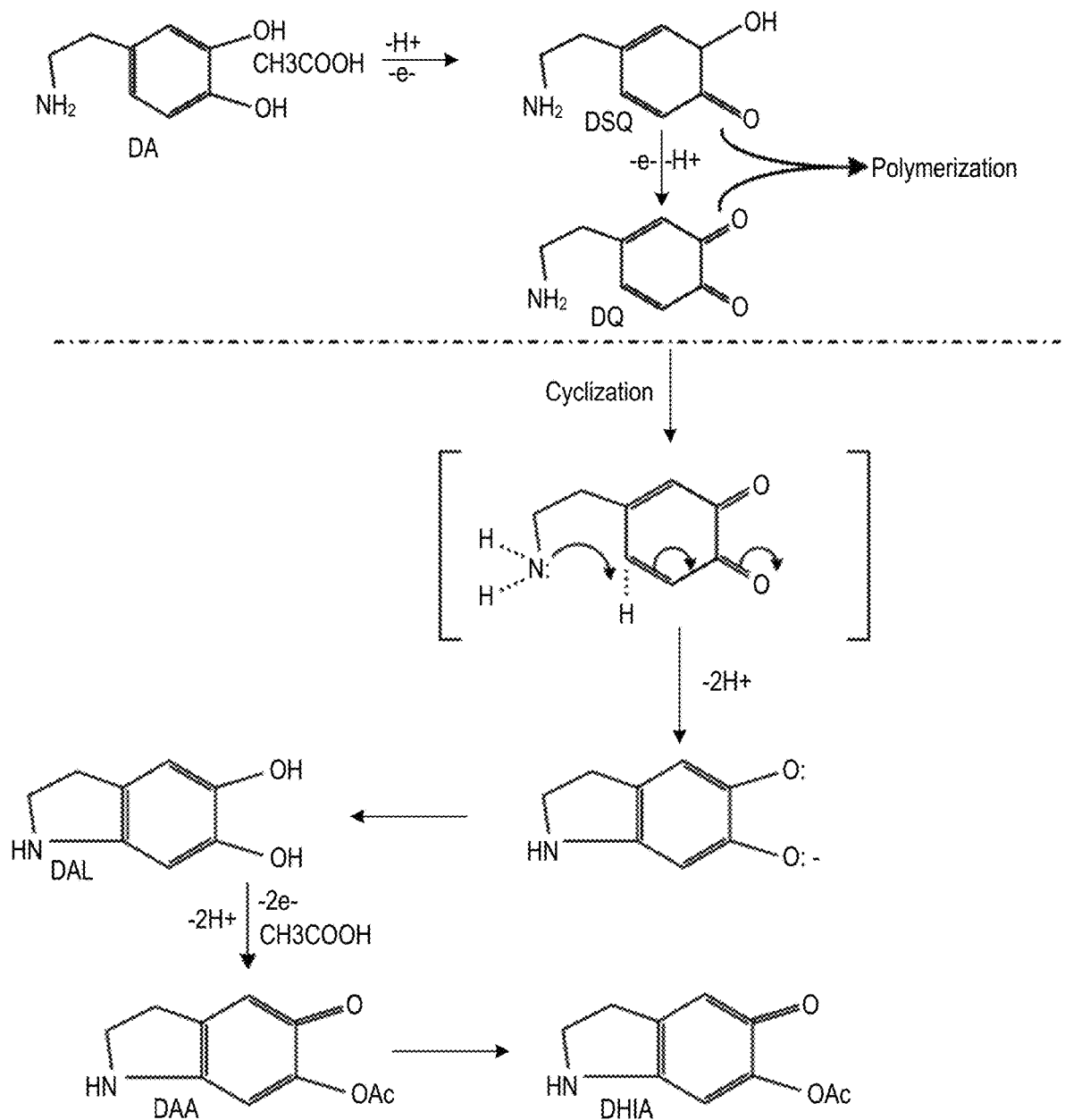
FIG. 1 shows a schematic of the steps in the oxidation process of dopamine hydrochloride. The scheme shows oxidation of dopamine to dopamine semiquinone ("DSQ") and dopaquinone ("DQ"), either one or both of which can act as monomers in the polymerization reaction. Conversion of DQ into various indolines and indoles such as DAL (leukoaminochrome or 5,6-dihydroxyindoline), DAA (6-hydroxy-1,2,3,6-tetrahydro-5H-indol-5-one acetate) and dihydroxy indole acetate (DHIA) is shown below the horizontal line (■-■-■-). "OAc" stands for an esterified carboxylic acid (e.g., acetate). Exemplary carboxylic acids that may become esterified to the monomers and the polymers produced therefrom (see, e.g., FIGS. 2, 3A and 3B) include those of the form R1C(O)OH or R1R2CHC(O)OH, where R1 and R2 are defined below, amino acids; and ethylenically unsaturated carboxylic acids including vinyl carboxylic acids.
Figure 2A:
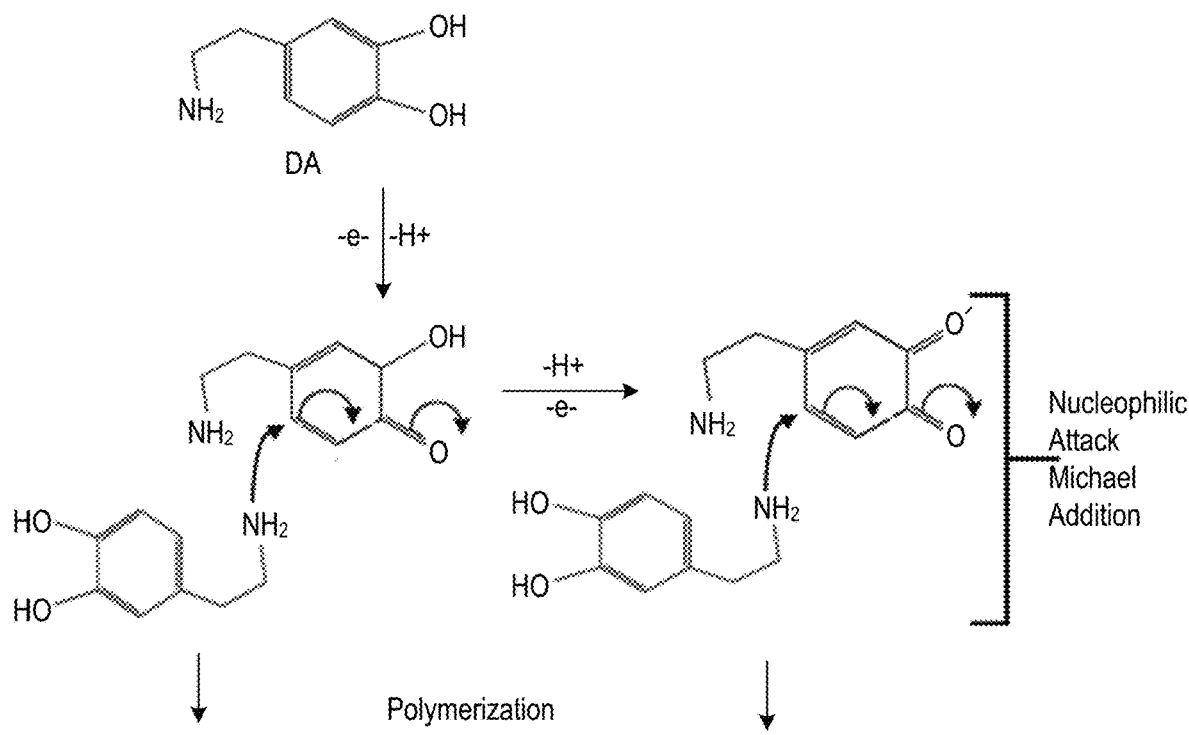
FIG. 2A depicts the reaction scheme for the conversions of dopamine to form poly(1,2 benzoquinone ethyl amine), poly(1,2-hydroxy benzoquinone ethyl amine), and poly(1,2 methyl acetate benzoquinone ethyl amine). The reaction depicts the oxidation of dopamine to dopamine semiquinone, followed by oxidation to dopamine quinone. Polymerization is understood to occur by a Michael addition type reaction where a pendant amine group acts as a nucleophile adding to the quinone or semiquinone ring (the attacking nucleophilic amine is shown as part of a dopamine molecule but could also be from the semiquinone, quinone or partially polymerized molecule. Polymerization continues by successive Michael additions. The polymers are shown as the polydopamine quinone (uppermost polymer), the dopamine semiquinone formed by reduction and protonation of the semiquinone (middle polymer), and the esterified polydopamine semiquinone (e.g., polydopamine acetate, lower polymer). The polymer chains may comprise a mix of quinone, semiquinone, and esterified quinone units depending on the oxidation state of the system and how completely the semiquinone becomes esterified. The value of n, m and p are not fixed for this figure, but rather are intended to show the polymer units can repeat (repeating units do not necessarily come in groups of four monomers. OAc is as defined in FIG. 1.
Figure 2A:
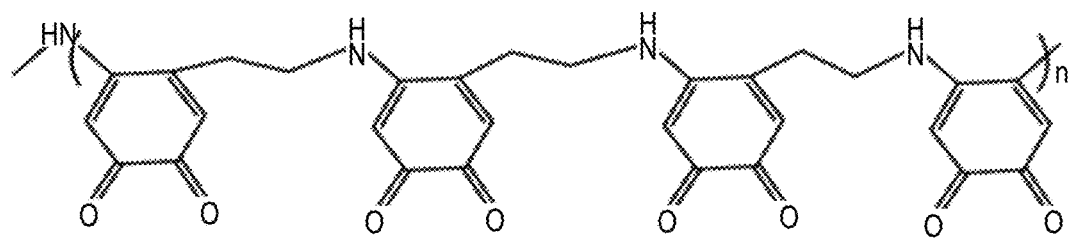
Figure 2A:
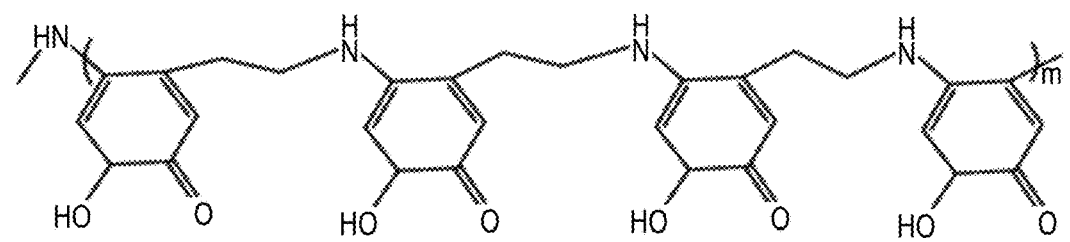
Figure 2A:
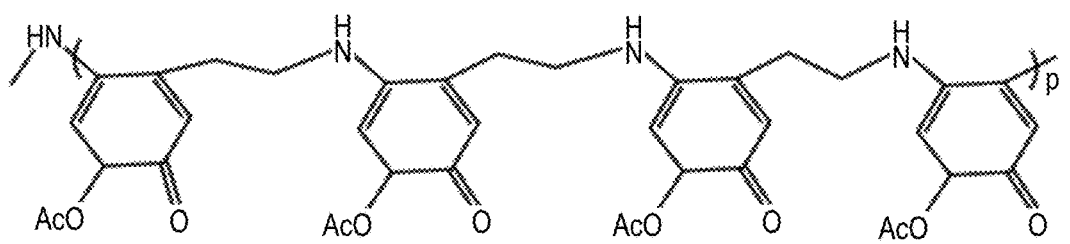
Figure 2B:
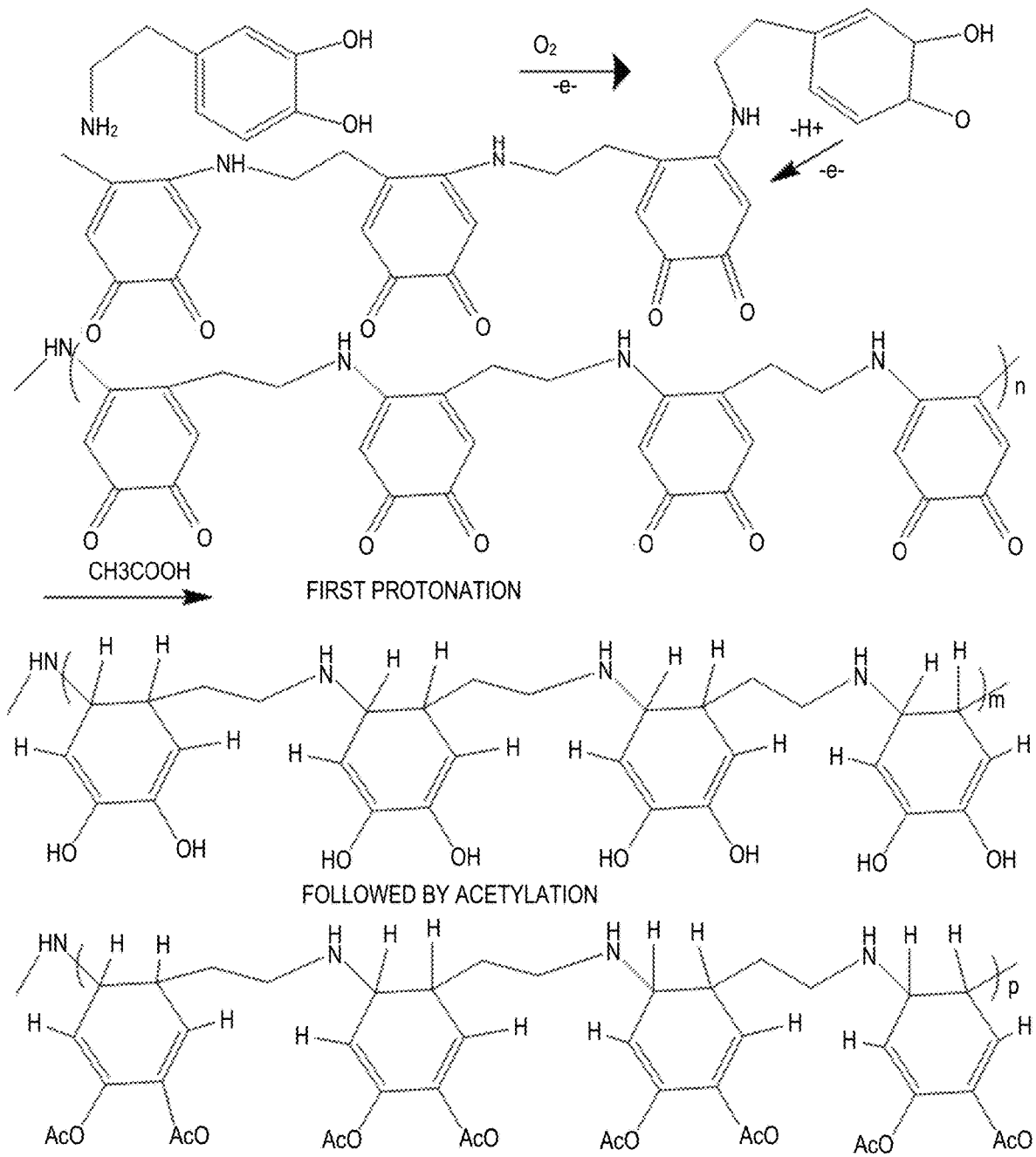
FIG. 2B also depicts the reaction scheme for the conversions of dopamine to form poly(1,2 benzoquinone ethyl amine), poly(1,2-hydroxy benzoquinone ethyl amine), and poly(1,2 methyl acetate benzoquinone ethyl amine) and indicates other potential macromolecular structural elements suggested by the NMR spectra in FIG. 14, including four types of protons on each quinol ring.

Unless stated otherwise, all weights are given on a dry weight basis.

Colloid or colloidal suspension as used herein means a mixture in which microscopically dispersed particles are suspended throughout another substance in the liquid state. The term "colloidal suspension" refers to the overall mixture. A colloid has a dispersed phase (the suspended particles) and a continuous phase (the medium of suspension) that generally arise by phase separation. The dispersed phase of a colloidal suspension does not appreciably settle out or separate from the mixture over at least a week or more at about 20° C.

Suspension as used herein means a heterogeneous mixture that contains solid particles sufficiently large to separate by sedimentation (substantially settling out of solution e.g. in a week at about 20° C.).

Polydopamine polymer(s) as used herein refers to thermoplastic polymers of dopamine and/or dopamine analogs formed in the presence of carboxylic acids (see, e.g., FIG. 2 or FIG. 3), including polydopamine homopolymers, polydopamine heteropolymers, polydopamine copolymers (copolymers of dopamine and other monomers), and esters of the foregoing with carboxylic acids (sometimes referred to as esterified polydopamine, polydopamine esters, or esterified polydopamine polymers).

Core polymer as used herein is a polymer from which the core of a core-shell particle having a polymeric core is made.

Bearing component(s) as used herein means one or more part(s) of a mechanical bearing, such as the flat plates of linear bearings or the housing, bushing (e.g., solid sleeved, solid flanged, split, or clenched bushings), and journal (or shaft) of plain rotating bearings.

Bearing material as used herein means a material used in a bearing or component of a bearing.

Tribological component(s) as used herein means one or more part(s) of a mechanical bearing that comprise a tribological material and provide a desired level of friction, reduce wear, and/or lubrication.

Tribological material as used herein means a material used in a bearing or a tribological component of a bearing that provides a desired level of friction, reduces wear, and/or provides lubrication. Tribological materials are solids within the operating temperature of the bearing.

Tribological surface as used herein means a surface that controls friction, reduces wear and/or provides lubrication.

Substantially free, as used to describe compositions, means less than about 1% by weight.

II. Detailed Description

Polymers used in bearings designed to function efficiently as hot-melt pressure sensitive adhesives (PSAs) for bonding bearing materials and tribological materials together (e.g., bonding a supporting substrate and a fluoropolymer tribological material to make a bearing component) are required to provide adhesion and joint strength. The performance of the polymers used in bearings necessitates a combination of polymeric structures that possess a macromolecular ensemble providing mechanical attributes that can be summarized into two broad categories: properties that provide for the adhesion between the polymer and the surfaces of diverse substrates, and properties providing the strength of the polymer chains as measured by the viscoelastic response under load. It is conceivable that the interfacial interaction between adhesive polymers and substrates can be enhanced by the presence of a distribution of polymer chains (e.g., varying in length to form high and low molecular weight polymer components). The ability of the polymeric material to withstand extensive plastic deformation for a considerable duration of time before failure requires a high molecular weight component that not only bears the applied stress but is not prone to be compromised by the plasticization effect of the low molecular component that occupies the contiguous special domain. Given that hypothetical model, the importance of designing contiguous interfacial polymeric ensembles of highly interwoven stacks of molecular architecture is necessary for an efficient and effective PSA.

Described herein are novel bearings and bearing components comprising an adhesive that comprises core-shell colloidal particles and suspensions of core-shell particles in which the particle core may be designed/selected to function as a deformable pressure sensitive matrix (e.g., a thermoplastic such as a thermoplastic fluoropolymer) that supports a pliable polydopamine polymer (e.g., a fully or partially esterified polydopamine heteropolymer) shell. The shell interfacially bonds to various materials including low surface energy polymers (such as fluoropolymers, polyolefins, and similar polymeric materials) and metal substrates (such as iron, copper, aluminum, titanium, magnesium, and alloys thereof including steel, bronze, and brass) permitting their use as an adhesive between diverse materials. For example, the core-shell colloidal particles and suspensions of core-shell particles may be used to bond fluoropolymers to alloys used for aerospace applications, including aluminum alloys suitable for making aerospace structural components like integral wing spars, ribs and webs. Although capable of bonding material with low surface energies (e.g., fluoropolymers and polyolefins) to materials with high surface energies (e.g., metals, alloys, various ceramics, etc.), the PSAs described herein may also be utilized to join articles with low surface energy surfaces (e.g., two PTFE articles), as well as to join intermediate and/or high surface energy materials (e.g., two different metals or metals and glasses).

A. Polymerization Reactions for Forming Dopamine Polymers

The thermoplastic polydopamine polymers (e.g., dopamine-based polymers) described herein can be prepared in solution and may be coated and/or grafted onto materials present in the solution (e.g., in the polymerization reaction). The thermoplastic polymers may be prepared by a method comprising contacting dopamine and/or dopamine analogs with one or more carboxylic acids in the presence of a redox initiator (such as elemental oxygen) in a basic buffer solution (such as tris-(hydroxymethyl)aminomethane), thereby forming a polymer comprising polymerized monomers of dopamine quinone, semiquinone, semiquinone ester, quinol, or quinol esters of the dopamine and/or dopamine analogs.

While not wishing to be bound by any specific theory, the method may be understood as the formation of polydopamine polymers initiated by contacting dopamine and/or dopamine analogs with a redox initiator (such as elemental oxygen) in a basic buffer solution (such as tris-(hydroxymethyl)aminomethane), thereby forming one or more monomers comprising quinones (dopaquinone), semiquinones (dopamine semiquinone, semiquinone esters) and/or analogs thereof. Once initiated, the reaction proceeds by the pendant alkyl amine group of a molecule of any one of the one or more monomers adding to another monomer thereby forming dimers comprising two monomers that have been covalently linked by a pendant alkyl amine group of a monomer. The dimers are extended to form oligomers by, for example, either (a) the pendant alkyl amine group of a molecule of any one of the one or more monomers or the alkyl amine of a molecule of a dimer reacting with another dimer molecule to extend the length of the dimer, or (b) the pendant alkyl amine of a molecule of any of the dimers reacting with a molecule of a monomer. The oligomers are extended to form polydopamine polymers by, for example, either (a) the pendant alkyl amine groups of a molecule of any one of the one or more monomers reacting with an oligomer molecule to form a polydopamine polymer, (b) the pendant alkyl amine of a molecule of an oligomer reacting with a molecule of a monomer to form a polydopamine polymer, and/or (c) the pendant alkyl amine of a molecule of an oligomer reacting with a molecule of oligomer to form a polydopamine polymer.

As discussed below, monomers other than dopamine, dopamine analogs, their oxidation products and carboxylic acid esters thereof may be incorporated into the oligomers and growing polymer chains during the process. The resulting polymers, which are still termed "polydopamine polymers" because of the presence of monomers arising from dopamine or dopamine analogs, display thermoplastic properties, are meltable for multiple cycles (e.g., at least 5, at least 10, or at least 20 cycles). That behavior contrasts with the thermoset properties associated with similar polymers incorporating dopamine prepared in the absence of organic acids (e.g., carboxylic acids) such as in the presence of inorganic acids (e.g., sulfuric, hydrochloric, phosphoric acids and/or the like) as such polymers cannot be melted for multiple cycles.

The polymerization of dopamine and/or dopamine analogs as described herein may be understood to be initiated by the oxidation (e.g., by molecular oxygen) and deprotonation of dopamine to form dopamine semiquinone which undergoes further oxidation/deprotonation to form dopamine quinone. Under the reaction conditions disclosed herein using a stable basic buffer (e.g., about pH 8.5 or in a pH range from about 8.5 to about 10.0), the semiquinone may also undergo esterification by carboxylic acids (or their anhydrides) added to the reaction to form a semiquinone ester. Dopamine and oxidized dopamine monomers (semiquinones and quinones) are understood to react with each other via nucleophilic attack of their pendant alkyl amine groups on the quinone or semiquinone groups thereby forming an amine linkage. This reaction is deemed favorable when the aqueous media is strongly basic and favors formation of macromolecular amino quinone-ester oligomers (e.g., semiquinone esters). When the reaction is conducted in an aqueous media the polymer may form a colloidal suspension, particularly where a colloidal suspension of particles (e.g., colloidal PTFE) is present in the reaction. When the colloidal reaction mixture is heated to about 220° C., the reaction proceeds to generate esters of the monomers by virtue of the presence of the carboxylic acid(s). The polydopamine esterified with acetic acid (—OAc) molecules is shown in FIG. 2. In addition to using molecular oxygen as an initiator, the reaction can be carried out with iron sulphate plus copper sulphate solution and tert-butyl hydroperoxide as an oxidant at ambient conditions (about 20° C.-30° C. and 760 mm Hg).

By way of example, the oxidation of dopamine hydrochloride by the dissolved oxygen present in an aqueous medium containing aqueous TRIS (hydroxymethyl)aminomethane (e.g., 0.3005 mols, in about 0.3 L buffered with 0.06 mols of acetic acid to yield a pH of 8.5) and dopamine hydrochloride (e.g., at a concentration of 0.3005 mol (1.0 M)) in the presence of an abundance of perfluorinated particles (e.g., PTFE-particles) promotes oligomerization and polymerization to form a polydopamine-acetate heteropolymer because of the high concentration of dopamine hydrochloride, as compared to the use of low concentrations (0.1 mM or less) of dopamine that favor intramolecular cyclization particularly in the absence of carboxylic acid. Under the reaction conditions employed herein the yield of leucodopaminechrome and related indolines and indoles (see, e.g., the compounds formed by cyclization in FIG. 1) from intramolecular cyclization of dopamine quinone (DQ) is low because of the energy required to form the strained five-member pyrrole (2,3-dihydropyrrole) ring in those molecules. That boundary to the formation of the cyclized products is indicated by the dashed line across FIG. 1.

The thermoplastic polydopamine polymers prepared by the processes described herein may be employed, for example as a thermoplastic (e.g., for molding articles), as a primer, or as an adhesive when formed or coated onto the surface of materials of all sizes and shapes including sheets. The need to provide uniform coatings of the polydopamine polymers is particularly important where the polymer is to be used as an adhesive layer applied to low surface energy materials such as fluoropolymer films. As such, it is desirable to provide uniform coatings devoid of visible surface imperfections such as pinholes and/or that do not undergo dewetting exposing the underlying substrate (e.g., a substrate fluoropolymer such as PTFE sheets/films). Preferably, there are no holes in the coating that expose an area of a substrate, such as a hole exposing more than 0.1 mm square or 0.05 mm square of a sheet on which the adhesive layer is applied. It is understood that not all of a substrate, such as the edges, needs to be coated with an adhesive layer and such uncoated areas are not considered when accessing surface uniformity/imperfections. For the purpose of attaining uniform coatings of the polydopamine polymers on diverse substrates, including those with surfaces having low surface energy such as polyolefins and fluoropolymers (e.g., PTFE or FEP), it has been found that formation of core-shell particles having a shell of polydopamine polymer(s) on particles (e.g., particles of thermoplastics such as PTFE) is beneficial. As discussed above, such core-shell particles can be formed by polymerization of dopamine salts (e.g., HCl salts) with carboxylic acids carried out in the presence of suitable particulate materials that serve as a core (e.g., particles of polymeric materials) upon which a shell comprising polydopamine polymers may be deposited and/or grafted. Aqueous dispersions/suspensions of such core-shell particles represent compositions that can be spread uniformly on low surface energy materials such as PTFE sheets or films (compare FIG. 8 or FIG. 9 with FIG. 10). Core-shell particles can be concentrated or collected from the polymerization reaction by methods such as centrifugation and/or filtration. The same methods can be used to exchange the liquids in which the core-shell particles are suspended for use as adhesive compositions (e.g., aqueous adhesive compositions). Drying of the compositions (e.g., aqueous compositions) to remove most (e.g., substantially all) of the bulk water provides an adhesive coating comprising the core-shell particles. The dried adhesive composition may comprise: less than 15%, less than 10%, less than 7.5%, less than 5%; less than 2.5% or less than 1% water and/or other solvents on a weight basis. The dried adhesive composition once reconstituted with water or other solvents may also retain its uniformity of coating over the substrate.

When the preparation of the polydopamine polymers is conducted in the presence of particles or materials in shapes/ forms other than particles, the synthesis consists of a two-step process: obtaining/introducing the particles or other materials into the polymerization reaction and initiation of the polydopamine polymerization reaction. While materials of many shapes may be employed, the process will be discussed in the context of particulate materials used to form core-shell particles where the core results from the introduced particles and where the polydopamine polymer(s) form the shell. Typically, a suspension, or a colloidal suspension, of core-shell particles is synthesized utilizing a colloidal suspension of core particles. Beginning with a high solid content suspension or colloidal suspension of core particles (e.g., core polymer particles such as PTFE), the shell (e.g., poly(dopamine-acetate)) is deposited upon and/or incorporated into (e.g., grafted on) the surface of the core particles by oxidative reaction of the dopamine monomer in the presence of one or more carboxylic acid(s) and a redox initiator such as elemental oxygen in a basic solution such as tris-(hydroxymethyl)aminomethane.

The efficiency of the redox synthesis technique provides a method for the in-situ generation of both low (about 10,000 to about 20,000 Daltons) and high (about 100,000 to about 6,000,000 Daltons) molecular weight components that, as previously discussed, may be advantageous to the function of a PSA. The absence of high concentrations of sodium or ammonium persulfates, encountered in thermal dopamine polymerization processes, also makes polydopamine polymers synthesized by the redox process less susceptible to the manifestation of colloidal instability brought on by the presence of a high concentration of sodium and other ions. The performance of PSA compositions prepared in the presence of high concentrations of ions (e.g., sodium ions) is also compromised by sorption of moisture, which is promoted by the presence of sodium ions, as a consequence of exposure to high relative humidity conditions. The presence of high concentrations of ionic species also induces the generation of ionic cross-links, which can have a deleterious effect on the mechanical properties of polydopamine polymers and PSA core-shell polymeric particles formed with those polymers.

The initiation of polymerization may be driven by a redox mixture of Cu and Fe salts, and hydrosulfite anions (e.g., copper hydrosulfite and iron hydrosulfite) in the presence of peroxide or oxygen. Redox initiation by a mixed metal system of Cu/Fe and hydrosulfite and a persulfate represents a unique technique in making high molecular weight emulsion polymers. The use of tris-(hydroxymethyl)aminomethane hydrochloride buffer solution and mixed iron/copper initiators/catalyst results in polymer emulsions (dispersion/suspension) with different particle sizes as compared to polymerization with peroxide or oxygen. For example, core-shell particles prepared in tris-(hydroxymethyl) aminomethane hydrochloride buffer solution in the presence of peroxide or oxygen (in the absence of Fe/Cu catalyst) may have bimodal or multimodal size distribution (diameter distribution). In an embodiment, the core-shell particles have a peak in the size range of 0.01 μm to 0.5 μm, and a peak in the range of 0.5 μm to 1.0 μm. In contrast, core-shell polymeric particles prepared using an Fe/Cu catalyst system tend to be unimodal, having a single maximum in the particle size distribution (diameter distribution). Such methods use low levels of Fe/Cu reagents, and yet provide rapid polymerization rates. In one aspect, this disclosure demonstrates that a redox catalyst mixture comprising Cu and Fe cations and hydrosulfite anions, without persulfate, can initiate polymerization of dopamine and dopamine analog monomers. A cyclic voltammetry study of different combinations of the reagents suggests that the transfer of electrons which are responsible for initiation of polymerization can take place in the absence of persulfate according to the following mechanism:

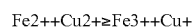
Fe2++Cu2+⇌Fe3++Cu+

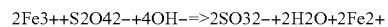
2Fe3++S2O42−+4OH−=>2SO32−+2H2O+2Fe2+

Amines can be used as a catalyst for the decomposition of the initiators such as oxygen or peroxide, thereby initiating the polymerization reaction. Examples of such amines include TRIS (hydroxymethyl aminomethane), hydroxylamine, tetraammonium hydroxide, diethylenetriamine, triethylenetetramine, diethylaminopropylamine, bis(p-aminocyclohexyl) methane, metaphenylene-diamine, isophorone diamine, n-aminoethylpiperazine, methylenediamine, 2-ethyl-4-methyl imidazole, and 4,4'-diaminodiphenlsulfone.

Efficient formation of polydopamine polymers in the presence of low surface energy substrates such as PTFE particles using aqueous media may be accomplished using β-cyclodextrin (e.g., about 0.1 to 2 percent based on the weight of the dopamine monomers) and one or more carboxylic acids. β-cyclodextrin added to the reaction mixture may function to transport monomers across the interface between water and the surface of core particles prepared from low surface energy polymers that may be hydrophobic. Surfactants, which may act as emulsifiers, can be added to keep the reaction mixture homogeneous and, like β-cyclodextrin, may assist in transporting dopamine monomers across the water interface with the core particles.

Figure 3A:
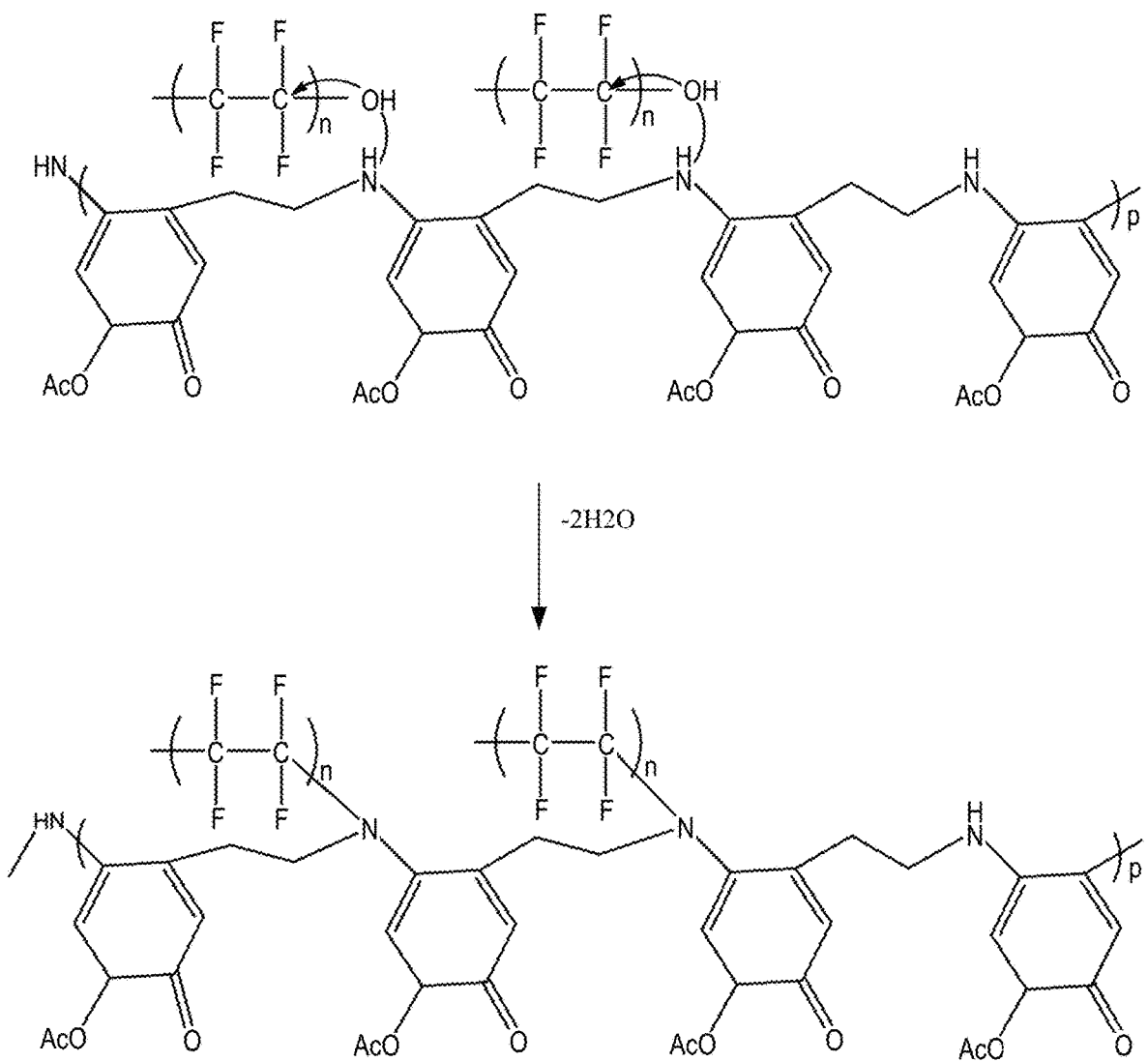
FIG. 3A shows a schematic of the molecular structure of the graft core-shell polymer structure.
Figure 3B:
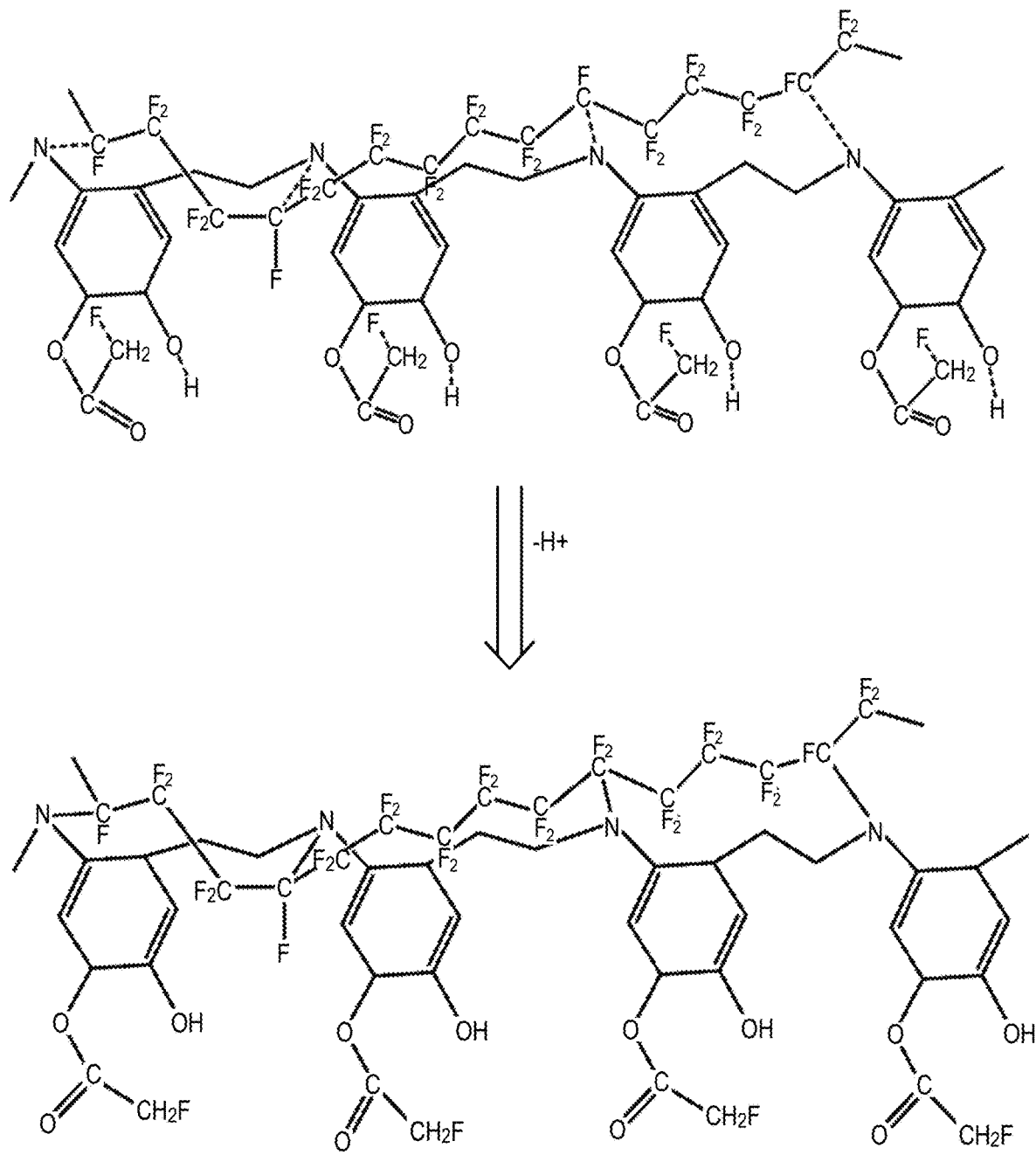
FIG. 3B shows an alternate view of a core-shell polymer grafted on a fluoropolymer. The vertical arrow indicates the application of heat to the polymerized dopamine resulting in equilibration of molecular forms.
Figure 4:
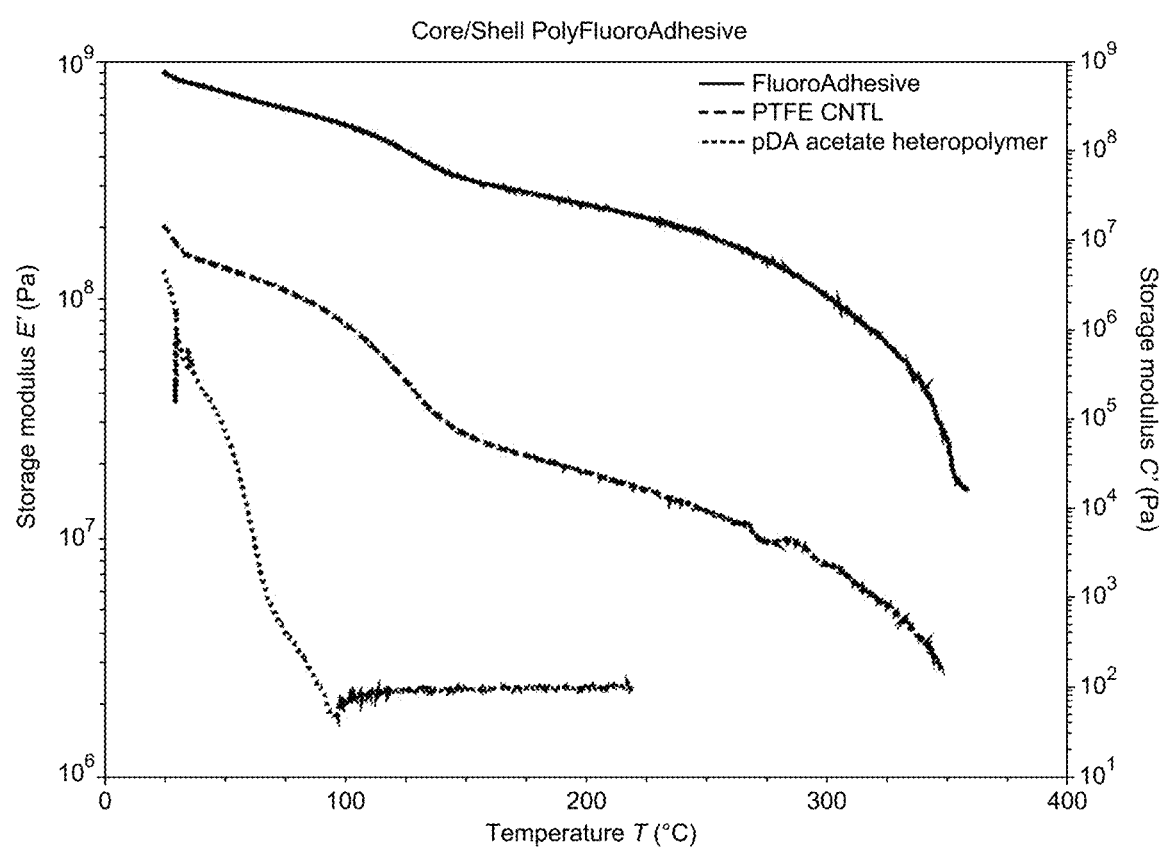
FIG. 4 illustrates Dynamic Mechanical Analysis (DMA) spectra recorded for polydopamine polymers prepared in the presence of acetic acid (acetate esterified polydopamine or polydopamine acetate, pDA, . . . ), solid polytetrafluoroethylene (PTFE) particles ( - - - ), and core-shell particles prepared from the acetate esterified polydopamine and the PTFE particles ("FluoroAdhesive" shown as a solid line, - - - ). The spectra show that the viscoelastic modulus of the core-shell polymer is significantly greater than the individual component (PTFE and poly(dopamine-acetate)) systems.
Figure 5:
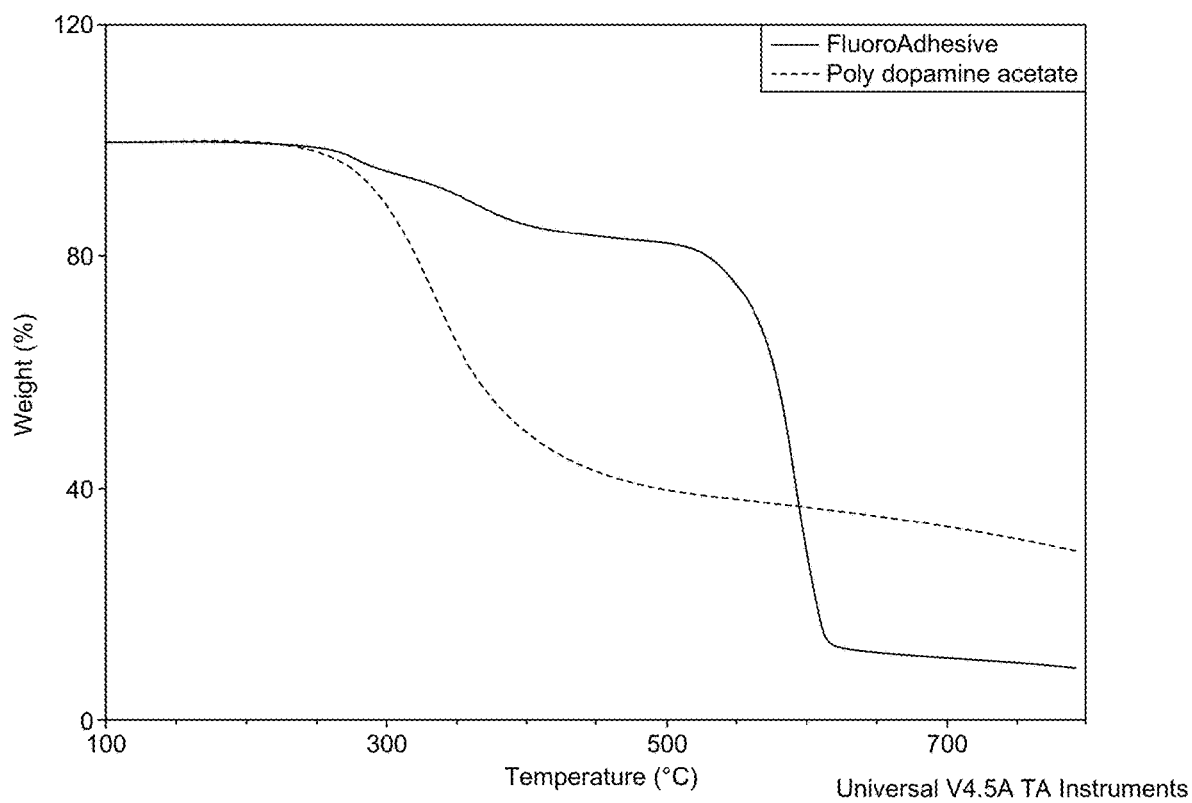
FIG. 5 illustrates thermogravimetric analysis (TGA) thermograms for a sample of a hot-melt FluoroAdhesive core-shell particle composition with a PTFE core and acetate esterified polydopamine (polydopamine acetate, pDA) shell and a sample of polydopamine acetate. The TGA thermogram shows evidence of weight loss and/or microscopic rearrangements, which can be attributed to the presence of three distinct types of polymer chains bearing comparatively different chemical and physical functional interactions which are identified by the thermogram. It is notable that the features of the thermogram for the shell polymer (polydopamine acetate) are distinctly different from those recorded for the core-shell graft copolymer. As shown, by comparison, the core-shell polymer exhibits superior thermal stability, with respect to weight loss.
Figure 6:
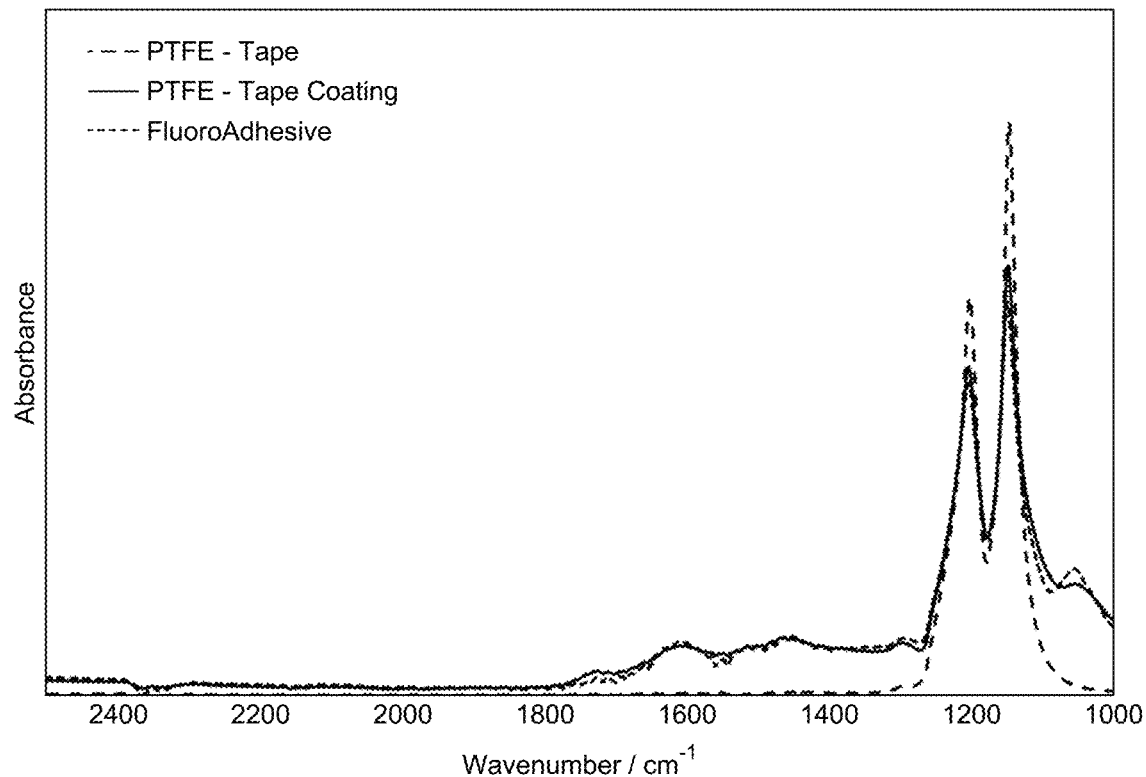
FIG. 6 depicts FT IR absorbance spectra for PTFE tapes and cured coatings of the colloidal dispersion along with control samples. Control PTFE film ("PTFE-Tape"), a control sample of the colloidal dispersion of core-shell polymer particles (PTFE core with poly(dopamine-acetate) shell) ("FluoroAdhesive"), and the PTFE film that is coated with the aqueous colloidal dispersion of core-shell particles ("PTFE-Tape Coating") are displayed. The characteristic strong C—F stretch bands 1202 and 1146 cm-1 evidence the presence of the fluoro-constituents. The characteristic acyl functionality absorbance band appears as a broad peak at about 1730 cm-1. This band is very likely the manifestation of the presence of the C=O stretch of the carboxyl functionality of the acyl moiety. Indole and indolequinone moieties may be present in residual amounts (e.g., 5% or 1% or less of the total dopamine monomers polymerized into the polymer). The characteristic band that is revealed in the spectrum for the residual indole is centered at 1608 cm-1. This band is the signature stretching frequency for the indole functionality. Another characteristic broad peak is at 1508 cm-1. This peak is characteristic of the residual indolequinone functionality. The band at approximately 1050 cm-1 is a representation of the secondary branching at the a-carbon of a cyclic secondary amine. The intensity of this band, which is due to —C—N stretch, is markedly reduced most likely due to the presence of the electron withdrawing —C=O group(s) at the para position, which affects the resonance contribution of the aromatic ring (see FIG. 2) and shifts the frequency to the shorter wavelength (high cm-1) values.

The reaction of dopamine monomers (e.g., dopamine hydrochloride) with a carboxylic acid (e.g., acetic acid) in the presence of core particles (e.g., thermoplastic particles such as PTFE particles) under aerobic conditions in an aqueous medium at a buffered pH of about 8.5 catalyzed by redox catalyst (such as molecular oxygen or other peroxide initiators) generates a mixture of polymeric structures that may be as depicted in FIGS. 2 and 3, with a shell of the heteropolymers shown in FIGS. 3A and 3B formed on the core fluoropolymer particles. When the reaction is conducted employing suspension or colloidal suspension of core particles, the resulting reaction mixture is in the form of a suspension or a colloidal suspension of thermoplastic core-shell particles. Those core-shell particles can be used as an agent that acts, among other things, as a PSA suitable for joining metallic and/or synthetic polymeric surfaces (e.g., fluoropolymers and/or polyolefins). In the case of PTFE core particles, the core-shell particles may be prepared with a water-soluble initiator in the presence of an anionic surfactant. The resulting core-shell particle-containing suspension may be uniformly coated on (polar and non-polar) surfaces. Once formed, the dopamine heteropolymers, including those incorporated into the shell layer of core-shell particles or coated onto surfaces, can be further modified by heating up to a temperature of 220° C. to remove moisture and enhance the formation of the esterified polymer(s). Such heat treatments result in enhanced thermal durability of the material when used, for example, as a pressure sensitive adhesive. The final esterified dopamine-based polymer, as shown in FIG. 2, is a novel heteropolymer that melts at 104-220° C. and possesses a molecular weight of approximately 10,000 to 60,000 Daltons. The molecular weight is determined by size exclusion chromatography by dissolving the polymer in a suitable solvent. When formed as a coating or shell, and particularly when grafted as a shell onto fluoropolymer particles, the melting, softening, and/or phase transition temperatures can be much higher (see e.g., the differences between polydopamine aetate and a polydopamine acetate shell grafted onto a PTFE core particle shown in FIGS. 4 and 5).

The molecular structures depicted in FIGS. 2A, 2B, 3A, and 3B represent the components understood to be present in polymers formed from the polymerization of dopamine in the presence of one or more carboxylic acids, with the structures in FIGS. 3A and 3B grafted to a fluoropolymer comprising a fluoroalkyl (in this instance perfluoroalkyl) chain. Other structures may be present in the final polymer including those having appended catechol ring structures.

Figure 7:
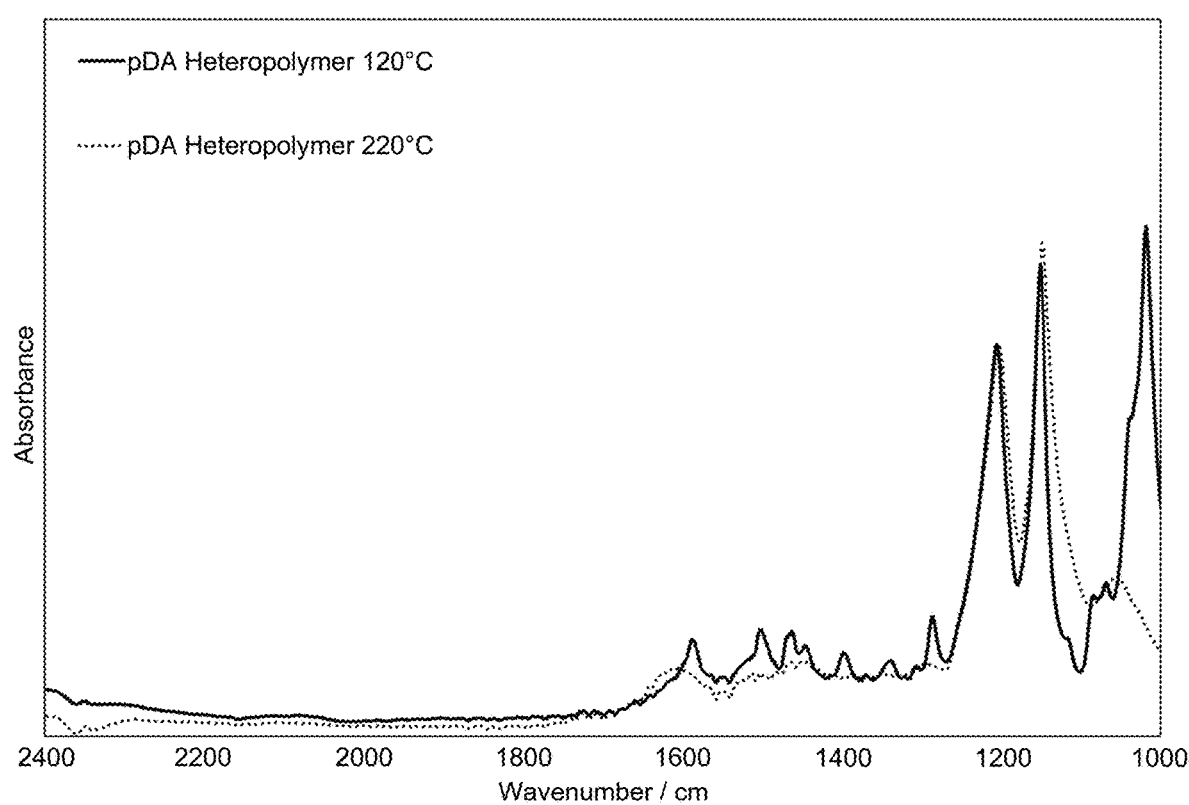
FIG. 7 depicts IR Spectra of poly(dopamine-acetate)-PTFE core-shell particle compositions treated at two different temperatures.

An evaluation of the IR spectra as depicted in FIG. 7, which shows an FT-IR spectrum of poly(dopamine-acetate)-PTFE core-shell particle compositions treated at two different temperatures, reveals that the aromatic conjugated carbonyls of the quinone moiety, revealed in the polymeric structures disclosed herein, have a band at 1300-1230 cm-1 as a result of the phenyl C—C stretch. This elucidates and supports the occurrence of the bands observed in the spectra.

The secondary aromatic amines have a —CNH bending absorption near 1510 cm-1, which as shown in the spectra (FIG. 7) is near the 1500 cm-1 aromatic band. Solid state phenols are known to exhibit IR absorption at 1390-1330 cm-1 of medium intensity and 1260-1180 cm-1 (broad intensity band) resulting from OH deformation and C—O stretch. The occurrence of the broad absorbance at 1342-1320 cm-1 and 1315-1250 cm-1 are likely due to the —CNH group attached to the quinone structure. The carbon-nitrogen stretching vibration also gives rise to a strong intensity band at 1050 cm-1.

The broad band resulting from —OH stretching at 3373 cm-1 is not shown. The —OH moiety is converted to acetate or another ester where a hydroxyl group (—OH) reacts with a carboxylic acid or acid anhydride (e.g., acetic acid) present in the reaction mixture. The 1050 cm-1 band that occurs prior to the second step heating of the core-shell coating solution to 220° C. may be due to the presence of —C—O—H groups resulting from the hydrolysis of the sulfate ester end groups present in PTFE. See FIG. 3A and FIG. 3B.

Figure 14:
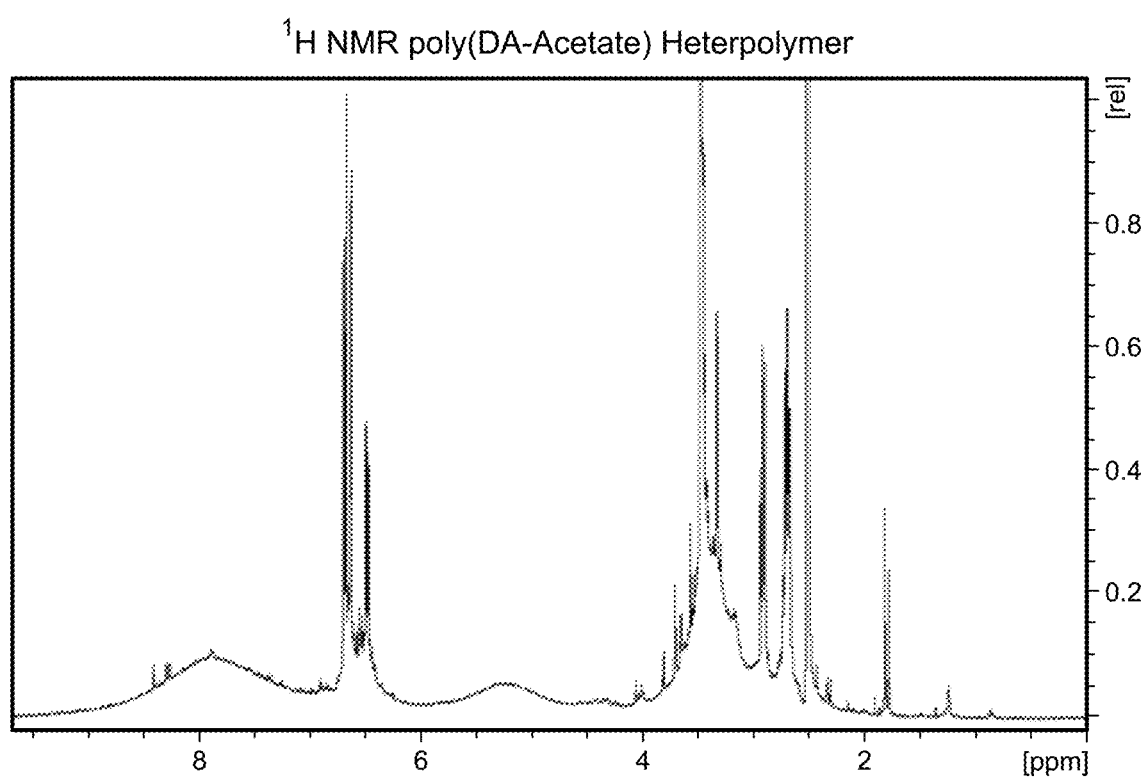
FIG. 14 shows 1H NMR spectrum of poly(DA-acetate) Heteropolymer.
Figure 15:
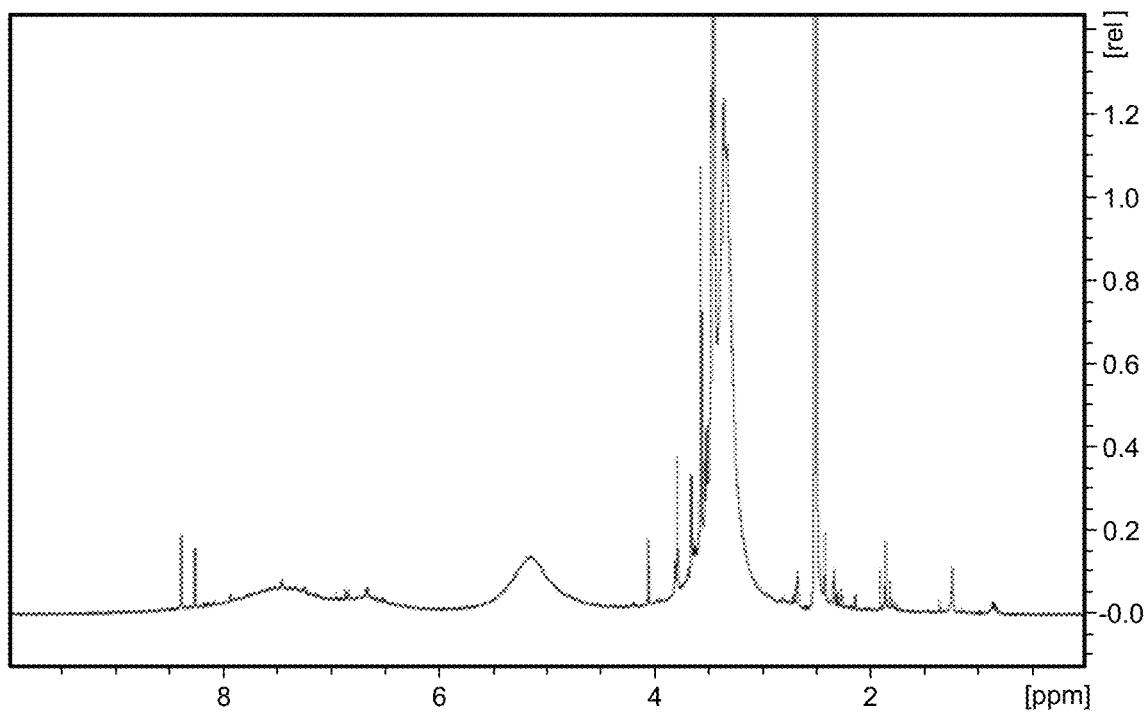
FIG. 15 illustrates 1H NMR spectrum of poly(DA-acetate)-g-PTFE FluoroAdhesive.

FIG. 14 shows the 1H NMR spectrum of polydopamine ester prepared in the presence of acetic acid and Tris (see, e.g., example 2) taken in deuterated DMSO. The spectrum shows, among other things, prominent peaks between 6.4 and 6.9 ppm reminiscent of the peaks displayed by dopamine, evidencing the presence of some catechol-like structures. FIG. 15 shows the 1H NMR spectrum of core-shell particles having a polydopamine ester shell grafted on a PTFE core nanoparticle prepared in the presence of acetic acid and Tris (see, e.g., example 3) taken in deuterated DMSO in which the particles are soluble. The peaks for the catechol-like structure present in the spectra shown in FIG. 14 appear highly reduced or absent in the spectrum of the core-shell particles (fluoroadhesive) shown in FIG. 15.

1. Dopamine and Other Monomers for Preparation of Polydopamine Polymers

The polydopamine polymers described herein may be prepared with dopamine. Alternatively, they may be prepared with one or more dopamine analogs or mixtures comprising one or more dopamine analogs and dopamine. Dopamine analogs include, but are not limited to, dopamine substituted with one or more independently selected lower alkyl groups (methyl, ethyl, propyl, isopropyl, n-butyl, sec-butyl, or isobutyl) and/or halogen atoms (Cl, F, or Br) at any one or more of the dopamine ring C3 position, dopamine ring C6 position, or alkyl side chains. Dopamine analogs and mixtures of dopamine analogs, including mixtures with dopamine itself, may be used in place of dopamine, including in the compositions and methods recited in the claims.

In addition to dopamine and/or dopamine analogs, a variety of ethylenically unsaturated molecules may be included in the dopamine polymerization reaction, including ethylenically unsaturated carboxylic acids. Ethylenically unsaturated molecules may be incorporated into the dopamine polymer through the above-described redox reactions. Ethylenically unsaturated carboxylic acids (e.g., with vinyl groups) may also be incorporated into the dopamine polymer through esterification reactions and/or redox reactions as described in the subsequent section, thereby leading to esterified dopamine polymers that may include crosslinks, cyclization of the polymer chains, free carboxyl, groups and alkene substituents (e.g., vinyl groups) appended to semiquinone groups.

Among the ethylenically unsaturated molecules that may be incorporated into polydopamine polymers are those set forth in Groups A-E that follow. Typically, such molecules or mixtures of such molecules (selected independently from any of Groups A-E) will be present in an amount less than 20% (e.g., less than 15%, less than 10%, less than 7.5%. less than 5%, less than 2.5% or less than 1%) by weight of the polydopamine polymer(s) on a dry weight basis (e.g., in a range selected from 0.1-20%, 0.1%-1%, 1%-2.5%, 2.5%-5%, 5%-7.5%, 7.5%-10%, 10%-15%, and 15%-20%). In an embodiment, the total weight of molecules recited in Groups A-E is greater than zero and less than 2.5% based on the total weight of the polydopamine polymer(s) (e.g., the shell of core-shell particles).

Group A: ethylenically unsaturated carboxylic acids and their esters such as acrylic acid (AA), methacrylic acid (MAA), methyl acrylate (MA), ethyl acrylate (EA), propyl acrylate (PA), butyl acrylate (BA) hexafluorobutyl acrylate (F6BA), 2-ethylhexyl acrylate (2EHA), methyl methacrylate (MMA), ethyl methacrylate, propylmethacrylate, butyl methacrylate (BMA), poly (ethylene glycol[200/400] monomethacrylate and mixtures thereof;

Group B: vinyl compounds such as ethylene, propylene, butadiene (BD), substituted butadienes such as alkylbutadiene-isoprene, allyl acrylate, allyl methacrylate (ALMA), vinyl chloride (VC), vinyl acetate (VA), styrene (ST), p-methylstyrene (PMS), 4-vinylpyridine (4 VP), 2-vinylpyridine (2 VP), N-vinylpyrrolidone (NVP), styrene sulfonic acid (SSA) and mixtures thereof;

Group C: unsaturated amides such as acrylamide, methacrylamide, N-methylolacrylamide and mixtures thereof;

Group D: other unsaturated monomers containing nitrogen or silicon such as dimethylaminoethyl acrylate, trimethylvinylsilane, methacryloxypropyltrimethoxysilane (MATS) and mixtures thereof;

Group E: copolymerizable surfactant as exemplified by perfluoro(4-methyl-3, 6-dioxaoct-7-ene)sulfonic acid.

The above-mentioned molecules, and mixtures thereof, must be chemically and physically compatible with one another as well as with the other components under the reaction conditions.

2. Carboxylic Acids

Polymerization of dopamine and dopamine analogs in the presence of carboxylic acids (e.g., alkyl carboxylic acids) gives rise to polydopamine polymers that display thermoplastic as opposed to thermoset characteristics. The resulting polymers may be esterified at one or more positions by a variety of carboxylic acids. Amino carboxylic acids, and ethylenically unsaturated carboxylic acids such as vinyl carboxylic acids or mixtures of any one or more, two or more, or three or more thereof (e.g., mixtures of alkyl, amino and unsaturated carboxylic acids) may be employed in the polymerization reactions.

Some exemplary carboxylic acids that may be employed in the polymerization reaction and become esterified to the monomers and/or polymers include those of the form R1C(O)OH or R1R2CHC(O)OH, where R1 and R2 are each selected independently from the group consisting of —H; phenyl; benzyl; —(CH2)nCH3 where n is 0-16; amino acids; ethylenically unsaturated carboxylic acids; and vinyl carboxylic acids; wherein any one or more of the esterified carboxylic acids may be substituted with one or more functionalities selected from the group consisting of: —F, —Cl, —Br, —OH, carboxy, amino, nitro, methyl, ethyl, and propyl. Some specific acids (structures shown as their anions) that may be esterified include formic acid, acetic acid, fluoroacetic acid, difluoroacetic acid, trifluoroacetic acid, cis-9-octadecatrienoic acid, cyclo-$C_6H11COO$—, $C_6H5CH2COO$—, $C_6H5COO$—, o-$CH_3C_6H_4COO$—, m-$CH_3C_6H_4COO$—, o-$BrC_6H_4COO$—, p-$BrC_6H_4COO$—, p-$CH_3C_6H_4COO$—, o-$ClC6H_4COO$—, m-$ClC_6H_4COO$—, p-$ClC_6H_4COO$—, m-$BrC_6H_4COO$—, o-$O_2NC_6H_4COO$—, m-$O2NC_6H_4COO$—, p-$O_2NC_6H_4COO$—, o-$C_6H_4(COO-)_2$, m-$C_6H_4(COO-)_2$, p-$C_6H_4(COO-)_2$, p-$HOC6H_4COO$—, o-$H_2NC_6H_4COO$—, m-$H_2NC_6H_4COO$—, p-$H_2NC_6H_4COO$—, o-$CH_3OC_6H_4COO$—, m-$CH_3OC_6H_4COO$—, and p-$CH_3OC_6H_4COO$—.

Some suitable alkyl carboxylic acids that may be employed in the polymerization reaction include one or more lower alkyl carboxylic acids, including mixtures comprising one or more of methanoic acid (formic acid), ethanoic acid (acetic acid), fluoroacetic acid, difluoroacetic acid, trifluoroacetic acid, propanoic acid, and butanoic acid. Some suitable amino acids that may be employed in the polymerization reaction include, but are not limited to, the common alpha amino acids: alanine, arginine asparagine, aspartic acid, cysteine, glutamine, glutamic acid, glycine, histidine, isoleucine, leucine, lysine, methionine, phenylalanine, proline, serine, threonine, tryptophan, tyrosine and valine (of the D and/or L configuration). In an embodiment the polymerization reaction employs one or more carboxylic acids selected from the group consisting of methanoic acid, ethanoic acid, propanoic acid, butanoic acid, 2-methylpropanoic acid, pentanoic acid, hexanoic acid, octanoic acid, decanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic acid), benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and 2-aminopentanoic acid.

Some suitable ethylenically unsaturated carboxylic acids (e.g., vinyl carboxylic acids) that may be employed in the polymerization reaction include those listed in the preceding section directed to Dopamine and Other Monomers for Preparation of Polydopamine Polymers. As described in that section, in addition to being incorporated into the polymer chain, ethylenically unsaturated carboxylic acids may become esterified to monomers and/or the polymer resulting from the polymerization reaction.

3. Core Particles

Core-shell particles, including those in the form of aqueous colloidal suspensions, each comprise a core particle. The core particles used in a synthesis may be of a single type or a mixture of two, three or more types of core particles having different chemical compositions and/or sizes. Core particles may be polymeric (e.g., thermoplastic or thermoset plastic), non-metallic inorganic materials, or mixtures thereof. Core particles may be of a size that gives rise to a suspension, or small enough to form a colloidal suspension. The core particles may be from 10 nm (nanometers) to 100 nm, 100 nm to 1 micron (μm), or 1 μm to 10 μm. Core particles of PTFE and other fluoropolymer particles may have an average diameter of about 0.050 μm to about 1.000 μm (e.g., about 0.100 μm to 0.500 μm). Core particles of PTFE and other fluoropolymer particles may have an average diameter of about 0.180 μm. to about 0.300 μm. For example, core particles of PTFE and other fluoropolymer particles may have an average diameter of about 0.200 μm to 0.225 μm or about 0.225 μm to 0.240 μm. Core particles of PTFE and other fluoropolymer particles may have an average diameter of about 0.240 μm to 0.275 μm. The solid content of the aqueous suspension or colloidal suspension of core particles introduced into the polymerization reaction may be about 10 to about 40 percent by weight (e.g., from about 20 to about 40 percent by weight).

A variety of polymeric core particles may be employed to prepare particles having a core-shell morphology suitable, for example, for use as a component of a pressure sensitive adhesive. Suitable core particles include one (a single type of polymeric particles) or a mixture (e.g., two or more types) of polymeric particles comprised of thermoplastic(s) or thermoset plastic(s). In an embodiment, the core-shell particles comprise core particles comprised of one or more polymers (e.g., organic polymers). In an embodiment, the core-shell particles comprise core particles comprised of one or more thermoplastics. In an embodiment, the core-shell particles comprise core particles comprised of one or more thermoset plastics.

The core of a core-shell particle may be comprised of 90% to 100% by weight of monofunctional vinyl monomers polymerized with 0% to 10% by weight of divinyl, trivinyl, tetravinyl monomers or mixtures thereof.

Some suitable polymeric materials that may be employed to prepare core particles (core polymers) include, but are not limited to:
 i) butadiene-styrene methyl methacrylate and homopolybutadiene particles,
 ii) polyvinyl chloride and vinyl chloride vinyl acetate copolymer particles,
 iii) acrylic homo and copolymer particles,
 iv) vinylidene chloride copolymer particles,
 v) polyethylene and ethylene copolymer particles,
 vi) polytetrafluoroethylene particles,
 vii) fluorinated ethylene copolymer particles,
 viii) polyacrylamide and polyacrylamide derivative particles,
 ix) acrylamide copolymer and derivative particles,
 x) polycarbonate polymer and copolymer particles,
 xi) polysulfone polymer and copolymer particles,
 xii) epoxy polymer and copolymer particles, and
 xiii) polyurethane polymer and copolymer particles.

Each of the core polymers listed above, which may be prepared from one or more ethylenically unsaturated monomers, may be copolymerized with one or more additional ethylenically and/or polyethylenically unsaturated monomers including, but not limited to, those comprising alcohols, diols (e.g., vicinal diols), carboxyl, ester, amide, or epoxy groups. Examples of additional polyethylenically unsaturated monomers include: divinyl benzene, allyl methacrylate, poly(propylene glycol)diacrylate, dipropylene glycol diacrylate, triethylene glycol dimethacrylate, polyethylene glycol 200 dimethacrylate, 1,3-butanediol dimethacrylate, 1,4-butanediol dimethacrylate, glycerol dimethacrylate, trimethylolpropanetrimethacrylate and diurethanedimethacrylate in an amount of about 0.1 to about 20 weight percent. In an embodiment, the core-shell particles comprise core particles comprised of one or more fluoropolymers (including perfluoropolymers). In an embodiment, the core-shell particles comprise core particles comprised of one or more perfluoropolymers.

Core-shell particles may comprise core particles that are comprised of one or more fluoropolymers selected from the group consisting of: perfluoroalkoxy alkanes; polytetrafluoroethylenes; fluorinated ethylene propylene and/or its copolymers; perfluoromethyl-vinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/ tetrafluoro ethylene/hexafluoropropylene fluoroelastomers; and combinations thereof. In an embodiment, at least one of the core particles is comprised of fluorinated ethylene propylene (FEP) and/or its copolymers.

Core-shell particles may also comprise core particles comprised of polytetrafluoroethylene. The core-shell particles may comprise core particles comprised of one or more polytetrafluoroethylenes (e.g., PTFE having different molecular weights).

The core of core-shell particles may also be made of nucleic acids, polyaramids, and/or polyamides such (e.g., nylons or proteins). The materials from which core shell particles are prepared may also comprise nucleic acid analogs (e.g., artificial nucleic acids including peptide nucleic acid (PNA), morpholino nucleic acids, locked nucleic acid (LNA), glycol nucleic acid (GNA), threose nucleic acid (TNA), hexitol nucleic acids (HNA), and nucleic acids into which one or more non-naturally occurring nucleobases have been incorporated.

Core particles employed for the preparation of particles having core-shell morphology may comprise materials other than or in addition to polymers (e.g., organic polymers). By way of example, the core-shell particles comprise core particles comprised of inorganic materials.

In an embodiment, the core-shell particles comprise core particles comprised of one or more metal oxides. For example, the core-shell particles may comprise core particles comprised of alumina (aluminum oxide (Al2O3)) which may be in the form of fumed alumina.

In an embodiment, the core-shell particles comprise core particles comprised of one or more metalloid oxides. For example, the core-shell particles may comprise core particles comprised of silica (silicon dioxide (SiO2)) which may be fumed silica.

Certain materials may be excluded from those which the core of core-shell particles are prepared. For example, the materials from which core particles are prepared may exclude nucleic acids and/or proteins. The materials from which core shell particles are prepared may also exclude nucleic acid analogs (e.g., artificial nucleic acids including peptide nucleic acid (PNA), morpholino nucleic acids, locked nucleic acid (LNA), glycol nucleic acid (GNA), threose nucleic acid (TNA), hexitol nucleic acids (HNA), and nucleic acids into which one or more non-naturally occurring nucleobases have been incorporated).

4. Core-Shell Particles Formed in Polymerization Reactions and Compositions Comprising Core-Shell Particles The core-shell emulsion polymerization techniques described herein may be employed so that the properties desired (e.g., to create a hot melt PSA) can be engineered into a single particle platform. One aspect of this disclosure provides the flexibility of an aqueous colloidal core-shell particulate system in which the particle core is optionally a thermoplastic copolymer and the shell is formed in a polymerization reaction yielding polydopamine polymers (e.g., polydopamine-acetate polymers), with the resulting core-shell particle providing the attributes of a hot-melt pressure sensitive adhesive.

One aspect of the disclosure is directed to aqueous dispersions comprised of core-shell particles, the core-shell particles comprising:
a polymeric core comprising from about 40 to about 95 percent by weight of the dry particle, wherein the polymeric core is comprised of:

(i) about 90 to about 100 percent on a dry weight basis of a core polymer comprised of one or more olefins (e.g., vinyl monomers and/or fluorinated olefin monomers such as a PTFE core particle); and (ii) up to about 5 percent on a dry weight basis of a core polymer of a multifunctional monomer, that acts as a reactive link for grafting the shell polymer;

a shell comprising from about 5 to about 60 percent based on a dry weight basis of the particle wherein the shell is comprised of:

(i) a thermoplastic shell polymer that is formed from the reaction of dopamine hydrogen chloride with a carboxylic acid or mixture of carboxylic acids; and (ii) about 0.1 to about 2 percent of β-cyclodextrin on a dry weight basis based on the weight of the shell polymer present in the core-shell particles.

Such aqueous dispersions may comprise from about 60% to about 90% water by weight (e.g., 60%-70%, 70%-75%, 75%-80% or 80%-90% water by weight) and from about 10% to about 40% (e.g., 10%-20%, 20%-25%, 25%-30% or 30%-40% water by weight) core-shell particles.

In some core-shell particles, including those used in aqueous compositions (e.g., suspensions or colloidal suspensions), the core comprises from about 45% to about 90% of the core-shell particle's weight and the shell comprises from about 10% to about 55% of the core-shell particle's weight on a dry weight basis. The weight of the shell includes the weight of cyclodextrin and surfactants/emulsifying agents. Cyclodextrin and surfactants, if present, may comprise, for example, about 0.1% to about 2% by weight of the shell polymer. As an example, a shell comprises a) about 20% to about 70% dopamine, b) about 10% to about 25% acetic acid, and c) about 20% to about 60% Tris buffer.

Drying of compositions (e.g., aqueous compositions) to remove most (e.g., substantially all) of the bulk solvent (e.g., water where the composition is aqueous) provides an adhesive coating comprising the core-shell particles. The dried adhesive composition may comprise: less than 15%, less than 10%, less than 7.5%, less than 5%; less than 2.5% or less than 1% water and/or other solvents on a weight basis. The dried adhesive composition, once reconstituted with water or other solvents, may also retain its uniformity of coating over the substrate.

In one embodiment core-shell particles, including those used in aqueous compositions, have a core particle that comprises a) about 45% to about 90% on a dry weight basis of the total weight of the core-shell particle; and b) a polymerized shell (grafted fully or partially on the core) that comprises about 10% to about 55% of the core-shell particle on a dry weight basis, of which dopamine constitutes about 20% to about 70% on a dry weight basis.

In another embodiment, the core-shell particles include the following features:

(i) a polymeric core comprising a fluoropolymer such as PTFE; and/or (ii) a polymeric shell comprising a mixture of poly(1,2 benzoquinone ethyl amine), poly(1,2-hydroxy benzoquinone ethyl amine) and poly(1,2 methyl acetate benzoquinone ethyl amine), one or more of which are covalently linked to the fluoropolymer core particle.

The polymers of the shell may be covalently linked to the fluoropolymer of the core particle through the nitrogen atoms(s) of the shell polymer.

Hot-melt pressure sensitive adhesive coatings can be prepared from suspensions of core-shell polymeric particles, including those described immediately above. The suspensions can be aqueous suspensions (e.g., aqueous suspensions or aqueous colloidal suspensions).

Thermogravimetric measurements (TGA) of the core-shell particles record the weight loss that occurs upon heating a particle sample in air, or in an inert atmosphere such as nitrogen. This measurement yields a quantitative response to any weight loss that is associated with the liberation of volatile components that occurs during a transition in temperature. The changes in weight can be attributed to the rupture and/or formation of diverse physical and chemical bonds at elevated temperatures that can promote the formation of higher molecular weight products. TGA measurements also yield information on the thermal stability of the material over a range of temperatures.

Dynamic Mechanical Analysis (DMA) measurements were conducted using the procedure and conditions outlined in ASTM D4065-12. The DMA measurements of the transitions associated with the movements of polymer chains under conditions that induce thermal and mechanical stresses reveal the influence that the shell's polymer has on the core-shell structure and on the thermal properties of the polymer composite. DMA measurement, which employs a strip of polymeric material constrained to flex at a rate of 1 Hz, records the resonant frequency and mechanical damping of the material. The data recorded from this measurement quantifies, by known mechanical damping, the amount of energy dissipated by the sample as it oscillates, while the resonant frequency yields the value of the Youngs Modulus (elastic) or stiffness. From the DMA measurements, the loss modulus and storage modulus can be determined and recorded. DMA analysis of core-shell particles having a shell of esterified polydopamine polymer and a PTFE core indicates that the elastic modulus of the PTFE core is significantly enhanced by apparent covalent coupling with the polydopamine polymer.

5. Interaction of Polydopamine Polymers with Core Particles and Other Materials

Polydopamine polymers contacted with or formed upon materials (e.g., as shells on core particles or on other materials such as sheets, films, or ribbons of materials such as fluoropolymers) can interact with and/or become bound to the particles or other materials through a variety of stabilizing interactions. The interactions may include, for example: adsorption of groups present in the polydopamine polymer(s) upon the surface of core particles and other materials; chemical bond formation between groups present in the polydopamine polymer(s) and groups present in or on the surface of core particles and other materials; dipole-dipole, hydrogen bonds and/or dispersion interactions between groups present in the polydopamine polymer(s) and the groups present on or in the core particles or other materials; and intercalation of groups present in the polydopamine polymer(s) and the surface of core particles or other materials.

The adsorbed groups are typically emulsifiers (e.g., surfactants/detergents) that have been employed in monomer emulsification. Common emulsifiers include: non-anionic surfactants (e.g., Tergitol), sodium lauryl sulfate, ammonium salts of sulfated nonylphenoxypoly(ethyleneoxy)ethanol, sodium diisopropyl naphthalene sulfonate and alkylamine-guanidine polyoxyethanol.

B. Applications of the Polydopamine Polymers and Core-Shell Particles Comprising Those Polymers in the Preparation of Bearings and Adhesive Tribological Materials The thermoplastic polydopamine polymers described herein find use as adhesives for the preparation of mechanical bearings and bearing components. Bearing components comprising the hot melt adhesives include tribological materials, such as PTFE and other fluoropolymers, having a coating of the adhesives particularly in the form of core shell particles. The components may be assembled into bearings by processes that comprise contacting the adhesive surface with another bearing component/element at the location where it is to become bonded and providing heat and/or pressure as necessary to bond the materials. Alternatively, a bearing component made of metal or another material may be coated with the adhesive and the tribological coating brought into contact with at least a portion of the bearing where the adhesive has been applied with heat and/or pressure applied as needed to form the bond.

The thermoplastic polydopamine polymers described herein also find a variety of uses as plastic materials, as primers for diverse surfaces, and as adhesives. The thermoplastic esterified dopamine polymers and core-shell particles incorporating those polymers as shell layers may be formed into a variety of articles including but not limited to films, sheets, ribbons, fibers, filaments, webs of fibers and the like. Those articles may be used for a number of purposes including as adhesive layers, primers, polymers for additive manufacturing, etc.

The aqueous compositions comprising core-shell particles described herein offer the advantage of forming uniform coatings on low surface energy materials such as fluoropolymers that tend to be hydrophobic (contact angle with water droplets greater than about 90 degrees at 20° C. as measured by a goniometer). Accordingly, those materials may be used to form uniform coatings even on fluoropolymer sheets (e.g., PTFE sheets/films), thereby providing adhesive PTFE materials with a surface bearing a uniform coating of a hot-melt pressure sensitive adhesive. Such sheets or films can be used for a variety of purposes, including to form plain bearings having flat surfaces that slide past one another.

The application of the aqueous adhesive compositions is environmentally friendly using principally water, rather than organic solvents, in their preparation and use. Moreover, the application of aqueous adhesives may be conducted using commercially practiced techniques including Gravure roll coating techniques. Application of the adhesive core-shell particle compositions can be carried out by both the direct Gravure coating or the offset Gravure coating technique. Those techniques are applicable for the aqueous colloidal suspensions of adhesive core shell particles, particularly when they have a viscosity of 10-100 mPa·s (milliPascal seconds) at the temperature of application (e.g., about 20° C.). The Gravure technique is capable of coating a substrate at a speed of 900 m per min. Other techniques including curtain coating and spraying may be employed to apply the adhesive compositions, and Mayer rod(s) may be employed to control the adhesive coating thickness. The adhesive coating may be applied at any desired thickness, including at a thickness that ranges from 1 to 50 µm (e.g., 1-10, 10-20, 20-30, 30-50 µm); although coatings can be formed with greater thicknesses (e.g., from 50-100 or 100-200 µm) if desired.

The application of an aqueous adhesive composition to a substrate is generally followed by a drying step at a temperature up to about 220° C. When the substrate is in the form of a sheet or film, the coated substrate after cooling may be spooled into a roll of adhesive material for use as a layer of tribological material in bearings or bearing components. Rolls of tribological material coated with the adhesive once prepared can be laminated to a substrate such as a sheet of tempered or stainless steel, aluminum, titanium, magnesium, bronze, brass, superalloys, aerospace alloys, and the like. The metal substrate can be heated (e.g., from about 280 to about 340° C.) to bond the laminate's layers. Lamination may be completed by passage through a nip region of plates (e.g., a tapered nip region) or through large diameter calendar rolls under compressive pressure (e.g., ranging from 0.5-3.2 MPa). The laminate product may then be heated to 360-400° C. for 1-20 seconds (e.g., 12 seconds) followed by cooling (e.g., with aqueous coolant mixture and/or air to room temperature). The laminate can be coiled into a roll for further coating and/or forming into bearing components.

Fluoropolymer (e.g., FEP or PTFE) films, sheets, or ribbons can also be coated on one side with the colloidal polymers (suspension of core-shell colloidal particles), heated to a temperature up to 220° C. if desired, and packaged for distribution. The distributed materials find use as a means of providing a tribological material securable to other materials.

The thermoplastic polydopamine polymers may advantageously be incorporated into the shell of core-shell particles, which find use as pressure sensitive hot-melt adhesives. In embodiments where the core is a fluoropolymer (e.g., PTFE), the elastic modulus of the core particle is enhanced in the presence of the thermoplastic polydopamine polymer shell.

Core-shell particles having a thermoplastic polydopamine polymer shell and fluoropolymer core find particular use in the preparation of adhesives for binding low surface energy materials such as polyolefins and fluoropolymers with high surface energy substrates such as glasses, ceramics, metals and metal alloys. The adhesive properties of the thermoplastic polydopamine polymers, especially when serving as the shell of a core-shell particle, are particularly suitable for the preparation of bearings and tribological surfaces where a low surface energy material is bonded to a metal or metal alloy structure.

In one embodiment, a fluoropolymer (e.g., FEP or PTFE) film, sheet, or ribbon can be coated on one side with the colloidal polymers (suspension of core-shell colloidal particles), heated to a temperature up to 220° C. if desired, and packaged for distribution. The distributed materials find use, among other things, as adhesive materials applied by heat pressing the film, sheet, or ribbon onto a surface. The adhesive materials may be employed to secure tribological and other materials, or as decorative and/or protective (e.g., water resistant) coatings.

As a means of producing materials having a coating of core-shell particles that can serve as an adhesive, a suspension (e.g., colloidal suspension) of the core-shell particles of this disclosure can be applied to the surface of an article such as a sheet, film, or ribbon (e.g., a sheet of polymeric material or section of a woven or non-woven textile). The application may be conducted by a curtain coating technique (or other technique such as spraying, rolling, spin coating etc.). Curtain coating techniques differ from a Gravure roll coating in that a film, ribbon, sheet, or textile is conveyed through a falling curtain of the aqueous fluid that is continuously metered onto article(s), such as articles in the form of a sheet, film, or ribbon. The thickness of the film applied is determined by the speed of the conveyor, the rate of delivery of the aqueous solution onto the moving substrate, and the Mayer rod(s) (if employed).

Aqueous compositions (e.g., suspensions or colloidal suspensions of core-shell particles) of the present disclosure can also be applied to a plastic sheet, film, or ribbon by the Gravure roll coating technique. This technique is applicable for aqueous colloidal suspensions that have a viscosity of about 10 to about 100 mPas at room temperature (20° C.).

The Gravure technique is capable of coating a substrate at a speed of 900 meters per minute at a coating thickness that ranges from 1 to 50 μm. The application can be carried out by both the direct Gravure coating or offset Gravure coating techniques.

The application of suspensions or colloidal suspensions of core-shell particles on an article may be followed by a drying step in an oven at a preset temperature (e.g., a temperature up to 220° C.). After drying, coated articles in the form of flexible ribbons, films, or sheets may be spooled into a dispensing roll for use in the preparation of tribological layers, for example, for bearings. Sheets, films, and ribbons may be, for example, polymeric (for example, see the list of fluoropolymers that follows) or metallic (e.g., such as steel, aluminum, copper, titanium, magnesium, bronze, brass, and alloys for aerospace applications). For example, see the list that follows of alloys and superalloys, especially aluminum alloys that are suitable for making aerospace structural components like integral wing spars, ribs and webs.

Application of the hot-melt adhesives described herein (e.g., those comprising the core-shell particles described herein), and the adherence of the adhesives to tribological materials such as PTFE and other fluoropolymers, does not require pre-etching or surface activation of the surface to be bonded by the adhesive. This includes the surfaces made of thermoplastics, fluoropolymers, FEP or PTFE, metal (e.g., iron, copper, aluminum, titanium etc.,), metal alloy (e.g., steel, brass, bronze, etc.), ceramic, or glass.

Mechanical bearings made of a substrate bonded to a tribological material by the hot-melt adhesives described herein (e.g., adhesives comprised of core-shell particles) do not require chemical or plasma etching of the tribological materials (e.g., PTFE and other fluoropolymers) or substrate surfaces for the adhesive to bond the tribological material to the substrate. The hot-melt adhesives described herein can, however, be applied to chemically or plasma etched materials/surfaces.

Chemical etching generally involves hazardous materials and etching for surface activation by other means (e.g., by plasma etching) is process and/or energy intensive particularly where the materials are generally inert, such as is the case with PTFE and other fluoropolymers used for tribological surfaces. Chemical etching can, however, alter the surface properties of the polymers allowing it to be joined to other materials by adhesives. Where surface activation to improve the adherence by the adhesives described herein is desired, etching can be done by any product known in the industry applicable to the material to be bonded. For example, PTFE etched thermoplastic film can be prepared by treating the film with a sodium in liquid ammonia solution. PTFE and other highly fluorinated polymers can also be etched using sodium/naphthene, which may be conducted in glycol ethers ("glymes" such as ethylene glycol dimethyl ether (monoglyme), diethylene glycol dimethyl ether (diglyme)). Other plastics can be etched for better adherence using a strong base such as sodium or potassium hydroxide. Etching can also be accomplished using a plasma, such as using oxygen plasma or argon plasma.

C. Materials and Substrates

Although the polydopamine polymers described herein are in and of themselves thermoplastics, they find additional uses including as coatings and primers. Polydopamine polymers, along with core-shell particles comprising those polymers as shell layers, can also act as a hot-melt pressure sensitive adhesive capable of binding to diverse materials including polymers (e.g., organic polymers such as fluoropolymers), ceramics, glasses, and metals including metal alloys. The polydopamine polymers and core-shell particles comprising those polymers as shell layers may be applied to any of those diverse materials to form an adhesive layer. Alternatively, any of those diverse materials may be adhered to an adhesive layer formed on all or part of the surface of an article (e.g., a substrate such as a sheet, wire, tube, tribological material support, or the like).

Among the diverse materials that can be coated with the hot-melt pressure sensitive adhesive or bound (e.g., as a tribological material) by the adhesive are polymers including thermoplastics and thermoset plastics. Included in those polymers are all of the above-mentioned polymers that may serve as core particles and composites comprising those polymers. Such polymers include polyolefins and fluoropolymers (including perfluoropolymers). By way of example, fluoropolymers include, but are not limited, to: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradenames TECNOFLON® or TECNOFLON® PFR and branded as KALREZ®, CHEMRAZ® and PERLAST®) or combinations thereof The fluoropolymers that may be employed include, but are not limited to, ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoroethylene/hexafluoropropylene fluoroelastomer (VF2/tetrafluoro ethylene/HFP) terpolymer; or combinations thereof. Fluoropolymer composites, including but not limited to PTFE combined with filler materials such as carbon, graphite, fibers (such as E glass and polyimides), and MoS2, (such as MoS2 filled PTFE/PEEK), may be utilized in an object (a surface, an interface, or a composite), or components thereof.

Included in the materials that can be coated with the hot-melt pressure sensitive adhesives or bound by the adhesives are metals and metal alloys. Metals that can be utilized include iron, aluminum, copper, cobalt, chromium, tungsten, vanadium, titanium, magnesium, nickel, and alloys thereof such as steel, bronze, brass, and super alloys. In an embodiment the alloys are aerospace aluminum alloys that typically include alloying elements of copper, magnesium, manganese, silicon, tin and/or zinc. Also included are a diverse group of materials collectively known as "super alloys" that generally display excellent mechanical strength, resistance to thermal creep deformation, good surface stability, and resistance to corrosion or oxidation (e.g., iron, chromium and nickel super alloys, or cobalt, chromium and nickel super alloys).

Included in the materials that can be coated with the hot-melt pressure sensitive adhesives or bound by the adhesives are materials comprising nucleic acids, nucleic analogs, polyaramids, and/or polyamides such (e.g., nylons or proteins).

In addition to polymeric materials and metals, glasses (e.g., soda-lime, borosilicate, fused silica, aluminosilicate, and lead glass) and ceramics including nitrides and carbides (e.g., kaolins, alumina, silicon nitride, silicon carbide, tungsten carbide, and the like) may be used.

III. Certain Embodiments

While the present technology has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, and/or process step or steps, to the objective, spirit and scope of the present disclosure. All such modifications are intended to be within the scope of the claims appended hereto.

1. A mechanical bearing comprising:
   a substrate bonded to a tribological material by an adhesive comprising a hot-melt pressure-sensitive core-shell polymeric particle comprising a core and a shell around the core;
   wherein the adhesive is comprised of up to about 95% by weight of the core-shell polymeric particles based on the weight of the adhesive; and
   wherein
   a. the core is a polymeric particle comprised of one or more polymers or the core is an inorganic particle comprised of one or more non-metallic inorganic materials,
   b. the shell comprises a thermoplastic polydopamine polymer comprised of dopamine and/or dopamine analog monomers polymerized to form the polydopamine polymer with one or more carboxylic acids (e.g., which may become esterified to the polymer), and
   c. 0 to 100 percent (e.g., from 5% to 10%, from 10%-25%, from 25%-50%, from 50%-75% or from 75%-100%) of the shell's thermoplastic polydopamine polymer is grafted onto the core.
2. The bearing of the preceding embodiment, wherein the core comprises a polymeric particle.
3. The bearing of any preceding embodiment, wherein the core comprises one or more thermoplastics.
4. The bearing of any preceding embodiment, wherein the core comprises 90%-100% by weight of monofunctional vinyl monomers polymerized with 0% to 10% by weight of divinyl, trivinyl, tetravinyl monomers or mixtures thereof.
5. The bearing of any preceding embodiment, wherein the core is a polymeric particle comprised of one or more fluoropolymers or perfluoropolymers.
6. The bearing of any preceding embodiment, wherein the core is a polymeric particle comprised of one or more polymers selected from the group consisting of: perfluoroalkoxy alkanes (PFA or PFAs when plural); polytetrafluoroethylene (PTFE); fluorinated ethylene propylene (FEP) and its copolymers; expanded polytetrafluoroethylene (ePTFE or EPTFE); expanded fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradename TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropylene/tetrafluoro ethylene/hexafluoropropylene fluoroelastomer (VF2/tetrafluoro ethylene/HFP) terpolymer; and combinations thereof, any or all of which may be in the form of particles.

7. The bearing of any preceding embodiment, wherein the core comprises vinylidene fluoride polymers or copolymers, polyvinyl chloride polymers or copolymers, or polytetrafluoroethylene (PTFE) polymers or copolymers.
8. The bearing of any preceding embodiment, wherein the core comprises polytetrafluoroethylene (PTFE).
9. The bearing of any of embodiments 1 to 3, wherein the core of the core-shell polymeric particle comprises one or more polymers selected from the group consisting of:
   i) butadiene-styrene methyl methacrylate and homopolybutadienes,
   ii) polyvinyl chloride and vinyl chloride vinyl acetate copolymers,
   iii) acrylic homo and copolymers,
   iv) vinylidene chloride copolymers,
   v) polyethylene and ethylene copolymers
   vi) polytetrafluoroethylenes,
   vii) fluorinated ethylene copolymers,
   viii) polyacrylamide and polyacrylamide derivatives,
   ix) acrylamide copolymers,
   x) polycarbonate polymer and copolymer,
   xi) polysulfone polymer and copolymer,
   xii) epoxy polymer and copolymer, and
   xiii) polyurethane polymer and copolymer;
   any or all of which may be in the form of particles.
10. The bearing of any preceding embodiment, wherein the core is a polymeric particle comprised of a polymer material that has a glass transition temperature ranging from −103° C. to 200° C.
11. The bearing of embodiment 1 or embodiment 2, wherein the core is a non-fluorinated or fluorinated thermoset plastic.
12. The bearing of embodiment 1 or embodiment 2, wherein the core is an inorganic particle comprised of one or more non-metallic inorganic materials.
13. The bearing of any of embodiments 1, 2, or 12, wherein the core is an inorganic particle comprised of a metal oxide or a metalloid oxide.
14. The bearing of embodiment 13, wherein the core is an inorganic particle comprised of silica or alumina.
15. The bearing of any preceding embodiment wherein the shell comprises from 2% to 100% (e.g., from 2% to 10%, from 10% to 20%, from 20% to 40%, from 40% to 60%, from 60% to 80%, from 80% to 90%, from 90 to 95%, or greater than 95%) of polydopamine polymer on a dry weight basis.
16. The bearing of any preceding embodiment wherein the polydopamine polymer comprises one or more carboxylic acids esterified to the polydopamine polymer at a quinol or semiquinol hydroxyl group.
17. The bearing of any preceding embodiment, wherein at least one (e.g., each) of the one or more carboxylic acids esterified to the polydopamine polymer is selected independently from the group consisting of: R1C(O)O— and R1R2CHC(O)O—, where R1 and R2 are each selected independently from the group consisting of —H, phenyl, benzyl; —(CH$_2$)$_n$CH$_3$ where n is 0-16; amino acids; ethylenically unsaturated carboxylic acids, and vinyl carboxylic acids;
   wherein any one or more of the carboxylic acids esterified to the polydopamine polymer may be substituted with one or more functionalities selected from the group consisting of: —F, —Cl, —Br, —OH, carboxy, amino, nitro, methyl, ethyl, and propyl.

18. The bearing of embodiment 17, wherein each of the one or more carboxylic acids esterified to the polydopamine polymer are selected independently from the group consisting of: formic acid, acetic acid, fluoroacetic acid, difluoroacetic acid, trifluoroacetic acid, cis-9-octadecatrienoic acid, cyclo-$C_6H_{11}COO$—, $C_6H_5CH_2COO$—, $C_6H_5COO$—, o-$CH_3C_6H_4COO$—, m-$CH_3C_6H_4COO$—, o-$BrC_6H_4COO$—, p-$BrC_6H_4COO$—, p-$CH_3C_6H_4COO$—, o-$ClC_6H_4COO$—, m-$ClC_6H_4COO$—, p-$ClC_6H_4COO$—, m-$BrC_6H_4COO$—, o-$O_2NC_6H_4COO$—, m-$O_2NC_6H_4COO$—, p-$O_2NC_6H_4COO$—, o-$C_6H_4(COO—)_2$, m-$C_6H_4(COO—)_2$, p-$C_6H_4(COO—)_2$, p-$HOC_6H_4COO$—, o-$H_2NC_6H_4COO$—, m-$H_2NC_6H_4COO$—, p-$H_2NC_6H_4COO$—, o-$CH_3OC_6H_4COO$—, m-$CH_3OC_6H_4COO$—, and p-$CH_3OC_6H_4COO$—.

19. The bearing of embodiment 18, wherein each of the one or more carboxylic acids esterified to the polydopamine polymer is selected independently from the group consisting of: formic, acetic and propanoic acid.

20. The bearing of embodiment 17, wherein each of the one or more carboxylic acids esterified to the polydopamine polymer is selected independently from the group consisting of: alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine valine, methanoic acid, ethanoic acid (acetic acid), fluoroacetic acid, difluoroacetic acid, trifluoroacetic acid, propanoic acid, butanoic acid, 2-methylpropanoic acid, pentanoic acid, hexanoic acid, octanoic acid, decanoic acid, undecanoic acid, tridecanoic acid, tetradecanoic acid, pentadecanoic acid, hexadecenoic acid, heptadecanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic), acrylic esters, benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and 2-aminopentanoic acid.

21. The bearing of any preceding embodiment, wherein the core-shell particles have diameters and a particle size distribution that is bimodal, wherein the diameters of the core-shell polymeric particles have a peak (maximum) in the range of 0.25 μm to 10 μm and a peak (maximum) in the range of 10 μm to 40 μm.

22. The bearing of any preceding embodiment, wherein the core comprises a thermoplastic polymer with a glass transition temperature from about −103° C. to 200° C.

23. The bearing of embodiment 22, wherein the core comprises a fluoropolymer with a glass transition temperature from about −103° C. to 0° C.

24. The bearing of embodiment 22, wherein the core comprises a polytetrafluoroethylene polymer with a glass transition temperature from about 0° C. to 200° C.

25. The bearing of any preceding embodiment, wherein the tribological material is flexible and the substrate is rigid, and the tribological material and the substrate bonded by the adhesive has a resistance-to-peel strength ranging from about 21-80 Newtons (N) as measured by ASTM D6862-11 at 20° C.

26. The bearing of embodiment 25, wherein the resistance-to-peel strength of the adhesive ranges from about 21 to about 30 N.

27. The bearing of embodiment 25, wherein the resistance-to-peel strength of the adhesive ranges from about 30 to about 60 N.

28. The bearing of embodiment 25, wherein the resistance-to-peel strength of the adhesive ranges from about 60 to about 80 N.

29. The bearing of any of embodiments 25-28, wherein the core comprises a fluorinated or perfluorinated polymer.

30. The bearing of any of embodiments 25-29, wherein the core comprises a PTFE.

31. The bearing of any of embodiments 25-30, wherein the shell comprises dopamine monomers polymerized with one or more carboxylic acids.

32. The bearing of any of embodiments 25-31, wherein the shell comprises dopamine monomers polymerized with acetic acid.

33. The bearing of any preceding embodiment, wherein at least 10% (e.g., at least 25%, at least 50%, at least 75%, or 100%) of the shell polydopamine polymer is grafted on to the core particle.

34. The bearing of any preceding embodiment, wherein the tribological material is comprised of a polymeric material.

35. The bearing of any preceding embodiment, wherein the tribological material is comprised of a fluoropolymer or perfluoropolymer.

36. The bearing of any preceding embodiment, wherein the tribological material is comprised of PTFE.

37. The bearing of any of embodiments 1-33, wherein the tribological material comprises: perfluoro-alkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradename TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; PTFE combined with filler materials; and/or MoS2, (such as $MoS_2$ filled PTFE/PEEK).

38. The bearing of any preceding embodiment, wherein the substrate is comprised of a metal or metal alloy.

39. The bearing of any preceding embodiment, wherein the substrate is comprised of a metal alloy.

40. The bearing of any preceding embodiment, wherein the substrate is comprised of iron, aluminum, copper, cobalt, chromium, tungsten, vanadium, titanium, magnesium, nickel, or alloys of any thereof.

41. The bearing of any preceding embodiment, wherein the substrate is comprised of a metal alloy selected from steel, bronze, brass, or a super alloy (e.g., an iron-chromium-nickel or cobalt-chromium-nickel super alloy).

42. The bearing of any of embodiments 1-37, wherein the substrate is comprised of a non-metal (e.g., a ceramic or a glass).

43. A method of forming a mechanical bearing or a bearing component comprising a substrate bonded to a tribological material by an adhesive comprising hot-melt pressure-sensitive core-shell polymeric particles, the method comprising applying a composition comprising the core-shell particles to all or part of the substrate and/or tribological material and contacting the substrate with the tribological material at a point where the composition has been applied.

44. The method of embodiment 43, wherein, subsequent to applying the composition, the substrate and/or tribological material is heated prior to the contacting step.

45. The method of embodiment 43 or 44, wherein the substrate and/or tribological material is heated subsequent to the contacting step.

46. A method of preparing an adhesive tribological material, the method comprising applying a composition comprising core-shell particles (e.g., an aqueous adhesive composition) to all or part of the tribological materials and optionally heating the tribological material.

47. A method of coating all or part of a bearing's substrate or a bearing's tribological material with an adhesive, the method comprising: applying an adhesive composition comprising core-shell particles (e.g., an aqueous composition) to all or part of the substrate and/or tribological material and optionally heating the substrate and/or tribological material.

48. The method of any of embodiments 44 to 47, wherein the substrate and/or tribological material is heated to a temperature from about 60° to about 220° C.

49. The method of any of embodiments 44 to 48, wherein the substrate and/or tribological material is heated to a temperature from about 60° to about 100° C.

50. The method of any of embodiments 44 to 48, wherein the substrate and/or tribological material is heated to a temperature from about 100° C. to about 150° C., or from about 150° C. to about 220° C.

51. The method of any of embodiments 44 to 48, wherein the composition comprising the core-shell particles is a suspension or colloidal suspension (e.g., an aqueous suspension or colloidal suspension) of the core-shell particles.

52. The method of any of embodiments 43 to 51, wherein the composition comprising the core-shell particles comprises greater than 5%, greater than 10%, greater than 20%, greater than 30%, or greater than 35% water on a weight basis.

53. The method of embodiment 52, wherein the composition comprising the core-shell particles comprises less than 65% water on a weight basis.

54. The method of embodiment 53, wherein the composition comprising the core-shell particles comprises from 5%-65% water by weight (e.g., 5%-10%, 10%-25%, 25%-50% or 50%-65% water by weight).

55. The method of any of embodiments 43 to 54, wherein the composition comprising the core-shell particles is a colloidal suspension.

56. The method of any of embodiments 43 to 55, wherein the core comprises a polymeric particle.

57. The method of any of embodiments 43 to 56, wherein the core comprises one or more thermoplastics.

58. The method of any of embodiments 43 to 57, wherein the core comprises 90%-100% by weight of monofunctional vinyl monomers polymerized with 0% to 10% by weight of divinyl, trivinyl, tetravinyl monomers or mixtures thereof.

59. The method of any of embodiments 43 to 58, wherein the core is a polymeric particle comprised of one or more fluoropolymers or perfluoropolymers.

60. The method of any of embodiments 43 to 59, wherein the core is a polymeric particle comprised of one or more polymers selected from the group consisting of: perfluoroalkoxy alkanes (PFA or PFAs when plural); polytetrafluoroethylene (PTFE); fluorinated ethylene propylene (FEP) and its copolymers; expanded polytetrafluoroethylene (ePTFE or EPTFE); expanded fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradename TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and combinations thereof.

61. The method of any of embodiments 43 to 59, wherein the core comprises vinylidene fluoride polymers or copolymers, polyvinyl chloride polymers or copolymers, or polytetrafluoroethylene (PTFE) polymers or copolymers.

62. The method of any of embodiments 43 to 60, wherein the core comprises polytetrafluoroethylene (PTFE).

63. The method of any of embodiments 43 to 57, wherein the core of the core-shell polymeric particles comprise one or more polymers selected from the group consisting of:
   i) butadiene-styrene methyl methacrylate and homopolybutadienes,
   ii) polyvinyl chloride and vinyl chloride vinyl acetate copolymers,
   iii) acrylic homo and copolymers,
   iv) vinylidene chloride copolymers,
   v) polyethylene and ethylene copolymers
   vi) polytetrafluoroethylenes,
   vii) fluorinated ethylene copolymers,
   viii) polyacrylamide and polyacrylamide derivatives,
   ix) acrylamide copolymers,
   x) polycarbonate polymer and copolymer,
   xi) polysulfone polymer and copolymer,
   xii) epoxy polymer and copolymer, and
   xiii) polyurethane polymer and copolymer.

64. The method of any of embodiments 43 to 63, wherein the core is a polymeric particle comprised of a polymer material that has a glass transition temperature ranging from −103° C. to 200° C.

65. The method of any of embodiments 43 to 57, wherein the core is a non-fluorinated or fluorinated thermoset plastic.

66. The method of any of embodiments 43 to 57, wherein the core is an inorganic particle comprised of one or more non-metallic inorganic materials.

67. The method of any of embodiments 43 to 57, wherein the core is an inorganic particle comprised of a metal oxide or a metalloid oxide.

68. The method of any of embodiments 43 to 67, wherein the core is an inorganic particle comprised of silica or alumina.

69. The method of any of embodiments 43 to 68, wherein the shell comprises from 2% to 100% (e.g., from 2% to 10%, from 10% to 20%, from 20% to 40%, from 40% to 60%, from 60% to 80%, from 80% to 90%, from 90 to 95%, or greater than 95%) of polydopamine polymer on a dry weight basis.

70. The method of any of embodiments 43 to 69, wherein the polydopamine polymer comprises one or more carboxylic acids esterified to the polydopamine polymer at a quinol or semiquinol hydroxyl group.

71. The method of any of embodiments 43 to 70, wherein at least one (e.g., each) of the one or more carboxylic acids esterified to the polydopamine polymer are selected independently from the group consisting of: R1C(O)OH or R1R2CHC(O)OH, wherein R1 and R2 are each selected independently from the group consisting of —H; phenyl; benzyl; and —$(CH_2)_n CH_3$ where n is 0-16 (e.g., 0-3, 4-7, or 8-16); and wherein the method optionally comprises a carboxylic acid of the R1C(O)OH or R1R2CHC(O)OH esterified to a semiquinone or quinol hydroxyl;

wherein any one or more of the esterified carboxylic acids is substituted with one or more functionalities selected from the group consisting of: —F, —Cl, —Br, —OH, carboxy, amino, nitro, methyl, ethyl, and propyl.

72. The method of embodiment 71, wherein the esterified carboxylic acid is selected independently from the group consisting of: formic acid, acetic acid, fluoroacetic acid, difluoroacetic acid, trifluoroacetic acid, cis-9-octadecatrienoic acid, cyclo-$C_6H_{11}COO$—, $C_6H_5CH_2COO$—, $C_6H_5COO$—, o-$CH_3C_6H_4COO$—, m-$CH_3C_6H_4COO$—, o-$BrC_6H_4COO$—, p-$BrC_6H_4COO$—, p-$CH_3C_6H_4COO$—, o-$ClC_6H_4COO$—, m-$ClC_6H_4COO$—, p-$ClC_6H_4COO$—, m-$BrC_6H_4COO$—, o-$O_2NC_6H_4COO$—, m-$O_2NC_6H_4COO$—, p-$O_2NC_6H_4COO$—, o-$C_6H_4(COO-)_2$, m-$C_6H_4(COO-)_2$, p-$C_6H_4(COO-)_2$, p-$HOC_6H_4COO$—, o-$H_2NC_6H_4COO$—, m-$H_2NC_6H_4COO$—, p-$H_2NC_6H_4COO$—, o-$CH_3OC_6H_4COO$—, m-$CH_3OC_6H_4COO$—, and p-$CH_3OC_6H_4COO$—.

73. The method of embodiment 72, wherein each of the one or more carboxylic acids esterified to the polydopamine polymer is selected independently from the group consisting of: formic, acetic and propanoic acid.

74. The method of embodiment 71, wherein each of the one or more carboxylic acids esterified to the polydopamine polymer is selected independently from the group consisting of: alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine valine, methanoic acid, ethanoic acid (acetic acid), fluoroacetic acid, difluoroacetic acid, trifluoroacetic acid, propanoic acid, butanoic acid, 2-methylpropanoic acid, pentanoic acid, hexanoic acid, octanoic acid, decanoic acid, undecanoic acid, tridecanoic acid, tetradecanoic acid, pentadecanoic acid, hexadecenoic acid, heptadecanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic), acrylic esters, benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and 2-aminopentanoic acid.

75. The method of any of embodiments 43 to 74, wherein the core-shell particles have diameters and a particle size distribution that is bimodal, and wherein the diameters of the core-shell polymeric particles have a peak (maximum) in the range of 0.25 μm to 10 μm and a peak (maximum) in the range of 10 μm to 40 μm.

76. The method of any of embodiments 43 to 75, wherein the core comprises a thermoplastic polymer with a glass transition temperature from about −103° C. to 200° C.

77. The method of embodiment 76, wherein the core comprises a fluoropolymer with a glass transition temperature from about −103° C. to 200° C.

78. The method of embodiment 76, wherein the core comprises a polytetrafluoroethylene polymer with a glass transition temperature from about −103° C. to 200° C.

79. The method of any of embodiments 43-78, wherein the tribological material is flexible, and when applied to a rigid substrate the tribological material and the rigid substrate bonded by the adhesive (e.g., comprising core-shell particles described herein) has a resistance-to-peel strength ranging from about 21-80 N as measured by ASTM D6862-11 at 20° C.

80. The method of embodiment 79, wherein the resistance-to-peel strength of the adhesive ranges from about 21 to about 30 N.

81. The method of embodiment 79, wherein the resistance-to-peel strength of the adhesive ranges from about 30 to about 60 N.

82. The method of embodiment 79, wherein the resistance-to-peel strength of the adhesive ranges from about 60 to about 80 N.

83. The method of any of embodiments 79-82, wherein the core comprises a fluorinated or perfluorinated polymer.

84. The method of any of embodiments 79-83, wherein the core comprises a PTFE.

85. The method of any of embodiments 79-84, wherein the shell comprises dopamine monomers polymerized with one or more carboxylic acids.

86. The method of any of embodiments 79-85, wherein the shell comprises dopamine monomers polymerized with acetic acid.

87. The method of any of embodiments 43 to 86, wherein at least 10% (e.g., at least 25%, at least 50%, at least 75%, or 100%) of the shell polydopamine polymer is grafted on to the core particle.

88. The method of any of embodiments 43 to 87, wherein the tribological material is comprised of a polymeric material.

89. The method of any of embodiments 43 to 88, wherein the tribological material is comprised of a fluoropolymer or perfluoropolymer.

The method of any of embodiments 43 to 88, wherein the tribological material is comprised of PTFE.

90. The method of any of embodiments 43-89, wherein the substrate or tribological material is substantially in the form of a tube (e.g., cylinder or cylindrical bushing), a film, a sheet, or a ribbon, and the composition comprising core shell polymeric particles is applied to all or part of one surface of the tube, film, sheet, or ribbon.

91. The method of any of embodiments 43-90, wherein the substrate or tribological material is substantially in the form of a cylinder having an axis and optionally a flange, wherein, when the flange is present, it is located in a plane substantially perpendicular to the axis that bisects the cylinder to form a substantially circular cylindrical cross section.

92. The method of any of embodiments 43-91, wherein the tribological material comprises: perfluoro-alkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; PTFE combined with filler materials; and/or MoS2, (such as $MoS_2$ filled PTFE/PEEK).

93. The method of any of embodiments 43-92, wherein the substrate comprises a metal, metal alloy, glass, ceramic, non-fluorinated polymer or fluorinated polymer.

94. The method of any of embodiments 43-93, wherein the substrate is comprised of a metal or metal alloy.

95. The method of any of embodiments 43-94, wherein the substrate material is comprised of iron, aluminum, copper, cobalt, chromium, tungsten, vanadium, titanium, magnesium, nickel, or alloys of any thereof.

96. The method of any of embodiments 43-93, wherein the substrate material is comprised of a metal alloy selected from steel, bronze, brass, or a super alloy (e.g., an iron-chromium-nickel or cobalt-chromium-nickel super alloy).

97. A method of forming a mechanical bearing of any of embodiments 43 to 96, wherein the tribological material is contacted with the substrate by applying sufficient heat and pressure to bond the tribological material to the substrate.

98. The method of embodiment 97, wherein the core particles are comprised of a thermoplastic.

99. The method of any of embodiments 43-98, wherein the substrate and/or the tribological material have not been chemically or plasma etched where the composition comprising the core-shell particles has been applied.

100. The method of embodiment 99, wherein the substrate or tribological material comprises a thermoplastic, fluoropolymer, FEP, PTFE, metal, metal alloy, ceramic, and/or glass.

101. The method of embodiment 100, wherein the tribological material comprises a fluoropolymer and/or perfluoropolymer.

102. The method of embodiment 101, wherein the tribological material comprises FEP and/or PTFE 103. A mechanical bearing prepared by the method of any of embodiments 98-102.

104. An adhesive tribological material prepared by the method of any of embodiments 46-92, wherein the adhesive tribological material comprises a tribological material having a hot-melt pressure-sensitive adhesive prepared from core-shell polymeric particles on at least a portion of its surface.

105. An adhesive bearing substrate prepared by the method of any of embodiments 47-98, wherein the adhesive bearing substrate comprises a tribological material having a hot-melt pressure-sensitive adhesive prepared from core-shell polymeric particles on at least a portion of its surface.

106. The mechanical bearing of any of embodiments 1 to 42, wherein the substrate and/or the tribological material have not been chemically or plasma etched where the adhesive that bonds the substrate and the tribological material is located (where the substrate and the tribological material are bonded).

107. The mechanical bearing of embodiment 106, wherein the substrate or tribological material comprises a thermoplastic, fluoropolymer, FEP, PTFE, metal, metal alloy, ceramic, and/or glass.

108. The mechanical bearing of embodiment 106, wherein the tribological material comprising a fluoropolymer and/or perfluoropolymer.

109. The mechanical bearing of embodiment 108, wherein the tribological material comprises FEP and/or PTFE.

IV. Examples and Supporting Materials

A. General Considerations

Using a sample of the polymeric particles as the core of the core-shell particles, dopamine and/or dopamine analogs are polymerized by an emulsion polymerization process. Polymerization may be carried under aerobic aqueous conditions catalyzed by ambient oxygen present at the dissolved aqueous concentration of about 1 to about 20 mg/L. The process involves the emulsification of the dopamine hydrochloride monomer, which is soluble in distilled water. A small sample of β-cyclodextrin is added to the core polymeric particles, which are slowly stirred to ensure the uniform distribution of the additive. A sample of the initiator solution, which consists of a buffered 8.5 pH solution of tris(hydroxymethyl)aminomethane (TRIS) and carboxylic acid is prepared. The emulsified solution of dopamine is gradually added to the buffer solution at the addition rate of 60-140 ml/hr. The presence of the carboxylic acid facilitates the protonation of the amine group, which generates an electrophile that reacts with the electron rich 1,2-dihydroxylbenzene-ethyl amine (which also undergoes oxidation to form poly(1,2-benzoquinone-ethyl amine) and poly(1,2-hydroxybenzoquinone-ethyl amine). The core polymeric particles are gradually added to the buffer solution at the addition rate of 60-200 ml/hr. At the end of the reaction, the pH is adjusted to 8.5 and the reactor is allowed to stand undisturbed for a minimum of two hours at ambient conditions (1 atmosphere of pressure and a temperature of about 20° C.). The resulting particles were sampled, and the size distribution determined by a particle size analyzer (Beckman Coulter Counter LS230 Multisite ICE particle size analyzer). Laser diffraction size range measurement (from 0.4 to 2000 μm) ISO13320-2009 were conducted and the sample(s) were found to have diameters in the range from 0.25 μm to 40 μm with an average size of 0.25 μm to 10.0 μm. Further analysis indicates the particle size distribution can be bimodal with a peak in the range of 0.25 μm to 10 μm, and a peak in the range of 10 μm to 40.0 μm. When heated (e.g., to a temperature less than about 220° C.), one or more of the components of the polydopamine polymer shell (e.g., poly(1,2-hydroxybenzoquinone-ethyl amine) undergoes esterification to form poly(1,2-methyl acetate benzoquinone-ethyl amine) (see, e.g., FIG. 3).

The polymerization of dopamine in the presence of a carboxylic acid (e.g., acetic acid) in the presence of fluoropolymer core particles (e.g., polytetrafluoroethylene (PTFE) particles) forms a shell polymer comprising, e.g., poly(1,2-benzoquinone acetate-amine), which is grafted onto the backbone of the fluoropolymer. However, neither the fluoropolymer particles (e.g., PTFE particles), nor the reaction product (poly(1,2-benzoquinone acetate-amine) formed from acetic acid and dopamine hydrochloride) form uniform films, i.e., free from surface imperfections, such as holes, when spread on low surface energy surfaces such as PTFE sheets due to the differences in surface tension. In contrast, an aqueous suspension or colloidal suspension of core-shell polymeric particles can readily be coated onto polar and non-polar surfaces with an absence of surface defects. Drying of the aqueous composition to remove most (e.g., substantially all) of the bulk water provides an adhesive coating comprising the core-shell particles.

B. Exemplary Compositions

Composition 1

Figure 8:
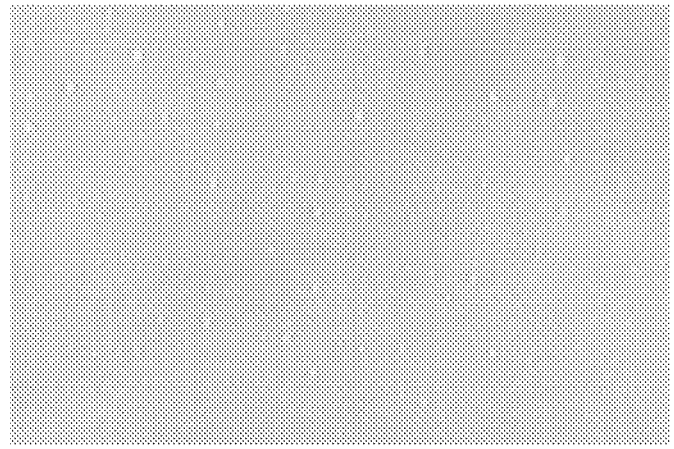
FIG. 8 shows an optical image of droplets of an aqueous polydopamine acetate that formed on a PTFE film after spreading an aqueous polydopamine acetate sample.

A dispersion/suspension prepared from PTFE aqueous colloid of 35% by weight of solid content is applied to a 150 mm wide PTFE film. The liquid is then drawn with a size 10 wire rod (12.7 mm diameter laboratory metering rod from Diversified Enterprise Claremont NH USA) to yield an approximate wet film thickness of 25.4 µm. The drawn film immediately separates into numerous droplets over the entire surface of the PTFE film. As shown in FIG. 8, a coating is not obtained from the solution.

Composition 2

Figure 9:
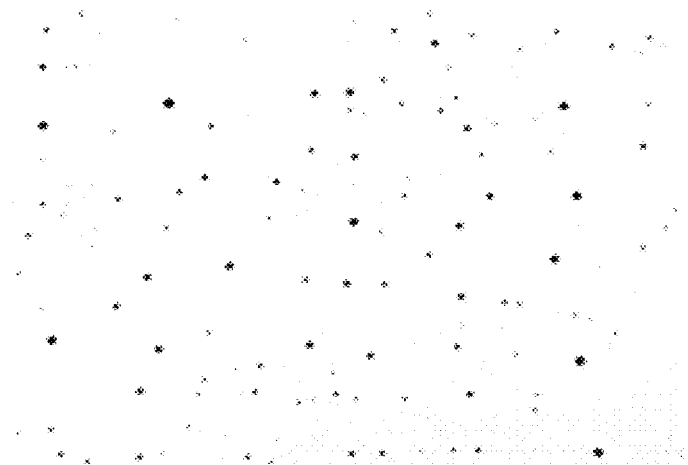
FIG. 9 shows an optical image of PTFE colloid droplets on PTFE film.

To a one-liter beaker is added 150 ml of distilled water. 18.2 grams of TRIS is added to the beaker which is stirred until the TRIS salt dissolves to yield a clear solution of 0.5M TRIS buffer. To this solution is added 9.0 ml of 25% acetic acid and the entire solution is stirred to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 5 minutes until the dopamine salt is completely dissolved. The aqueous dopamine solution is charged to a 250 ml reservoir from which it is metered to the one-liter beaker that contains the TRIS acetate buffer (pH8.5) solution at a rate of 60 ml/hr. During the reaction the mixture is sparged with 1.57 cc/sec of air. At the end of 60 minutes and through the reaction schedule, a sample is collected at 60-minute intervals and quenched in an ice bath prior to evaluation of UV/Vis spectra. During the reaction the pH of the batch is recorded every hour and the reaction mixture is stirred at a rate of 100 rpm over the 24-hour duration of the reaction. A sample of the aqueous solution is placed on a 150 mm wide PTFE film and drawn with a size 10 wire rod. The drawn film immediately separates into numerous droplets over the entire surface of the PTFE film. As shown in FIG. 9, a coating is not obtained from the solution.

Composition 3

Figure 10:
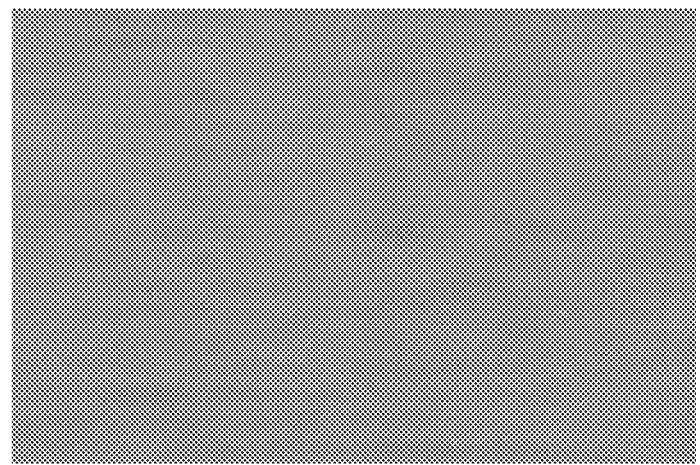
FIG. 10 shows an optical image of a uniform coating of an aqueous FluoroAdhesive composition comprising core-shell particles (PTFE core and polydopamine acetate shell) on a PTFE film.
Figure 11:
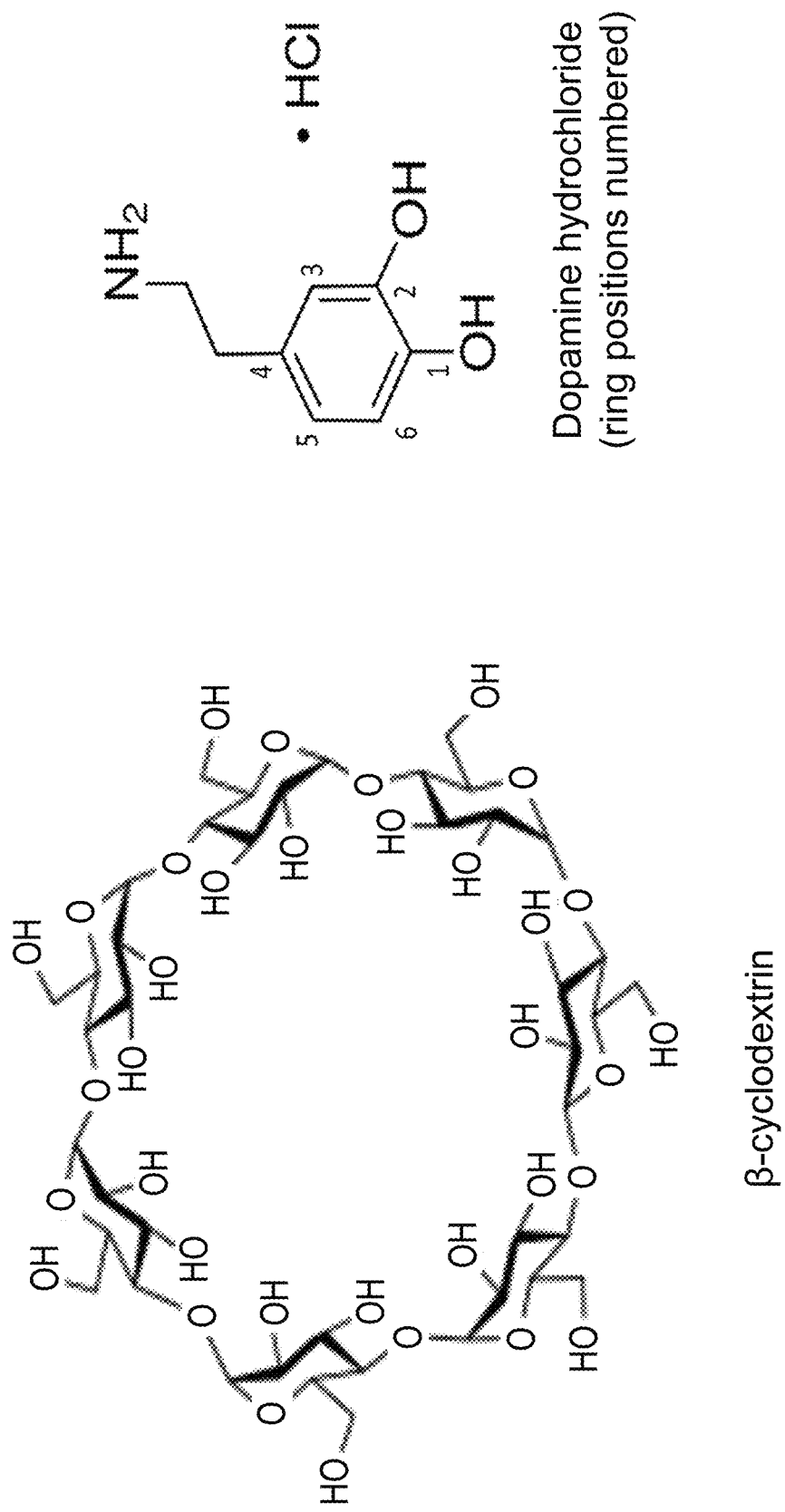
FIG. 11 shows the structure of β-cyclodextrin and dopamine hydrochloride having a pendant primary amine, shown with its ring positions numbered.

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is stirred to ensure complete dissolution. The pH of the solution is adjusted by the addition in increments of 1 ml of 25% acetic acid to yield a final pH of 8.5 units. A separate solution of dopamine is then prepared by the addition of 28.4 grams of dopamine to a beaker that contains 150 ml of distilled water and the mixture is stirred for five minutes until the dopamine is completely dissolved. To this solution is added another 28.4 grams of dopamine salt and the mixture is stirred for 30 minutes until the dopamine salt is completely dissolved. The aqueous dopamine solution is charged to a 250 ml reservoir from which it is metered to the one-liter beaker that contains the TRIS acetate buffer (pH 8.5) solution at a rate of 60 ml/hr. Simultaneously, 200 milliliters (mls) of a 35% aqueous dispersion of PTFE (Teflon™ PTFE DISP 35, particle size with average diameter of about 0.245 µm, obtained from The Chemours Company FC, LLC.) is delivered to the reaction vessel at 100 ml/hour. During the reaction, the pH of the batch is periodically recorded, and the reaction mixture is stirred at a rate of 100 rpm over the 24-hour duration of the reaction. At the end of the process, the core-shell particle (PTFE core particle with a polydopamine acetate shell) is sampled for coating onto a PTFE substrate. As shown in FIG. 10, a uniform defect free coating is obtained from the suspension of core-shell particles.

Composition 4

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is agitated to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 30 minutes until the dopamine salt is completely dissolved. The aqueous dopamine solution is charged to a 250 ml reservoir from which it is metered into the one-liter beaker that contains the TRIS acetate buffer (pH 8.5) solution at a rate of 60 ml/hr. 200 mls of a 35% aqueous dispersion of PTFE (Teflon™ PTFE DISP 35, particle size with average diameter of about 0.245 µm, obtained from The Chemours Company FC, LLC.) is delivered to the reaction vessel at 100 ml/hour. During the reaction, the pH of the batch is recorded periodically and the reaction mixture is stirred at a rate of 100 rpm over the 24 hour duration of the reaction. At the end of the process, the PTFE-particle is sampled for coating onto a PTFE substrate. A uniform coating on PTFE is obtained from the solution.

Composition 5

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is agitated to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. The aqueous dopamine solution is charged to a 250 ml reservoir from which it is metered to the one-liter beaker that contains the TRIS acetate buffer (pH8.5) solution at a rate of 60 ml/hr. 200 mls of a 35% aqueous dispersion of PTFE (Teflon™ PTFE DISP 35, particle size with average diameter of about 0.245 µm, obtained from The Chemours Company FC, LLC.) is delivered to the reaction vessel at 100 ml/hour. During the reaction, the pH of the batch is recorded periodically, and the reaction mixture is stirred at a rate of 100 rpm over the 24 hour duration of the reaction. At the end of the process, the PTFE-particle is sampled for coating onto a PTFE substrate. A uniform coating on PTFE is obtained from the solution.

C. Examples

Example-1

A coating of composition 3, wherein the coating is applied via Mayer rod to 80 vol % PTFE tape comprising 20 vol % calcium fluoride having a thickness of 0.38 mm. The coating

Example-2

A coating of composition 3, wherein the coating applied via Mayer rod to 80 vol % PTFE tape comprising 20 vol % calcium fluoride having a thickness of 0.38 mm. The coating having a thickness of 25.4 µm is dried in an oven at 220° C. for 30 minutes followed by lamination onto an aluminum substrate under conditions of 3.2 MPa pressure and 345° C. yielding a laminated bearing structure for evaluation by the ASTM D6862 procedure.

Example-3

A coating of composition 3, wherein the coating is applied via Mayer rod to PTFE/polyimide tape having a thickness of 0.38 mm. The coating having a thickness of 25.4 µm is dried in an oven at 220° C. for 30 minutes followed by lamination onto a steel substrate under conditions of 3.2 MPa pressure and 345° C. yields a laminated bearing structure for evaluation by the ASTM D6862 procedure.

Example-4

A coating of composition 3, wherein the coating is applied via Mayer rod to PTFE/polyimide tape having a thickness of 0.38 mm. The coating having a thickness of 25.4 µm is dried in an oven at 220° C. for 30 minutes followed by lamination onto an aluminum substrate under conditions of 3.2 MPa pressure and 345° C. yielding a laminated bearing structure for evaluation by the ASTM D6862 procedure.

Example-5

A coating of composition 3, wherein the coating is applied via Mayer rod to 50 vol % PTFE/50 vol % polyphenylene sulfide (PPS) tape having a thickness of 0.38 mm. The coating having a thickness of 25.4 µm is dried in an oven at 220° C. for 30 minutes followed by lamination onto a steel substrate under conditions of 1.3 MPa pressure and 345° C. yielding a laminated bearing structure for evaluation by the ASTM D6862 procedure.

Example-6

A coating of composition 3, wherein the coating is applied via Mayer rod to 50 vol % PTFE+50 vol % polyphenylene sulfide (PPS) tape having a thickness of 0.38 mm. The coating having a thickness of 25.4 µm is dried in an oven at 220° C. for 30 minutes followed by lamination onto an aluminum substrate under conditions of 1.3 MPa pressure and 345° C. yielding a laminated bearing structure for evaluation by the ASTM D6862 procedure.

Example-7

A coating of composition 4, wherein coating was applied via Mayer rod to 80 vol % PTFE tape comprising 20 vol % calcium fluoride having a thickness of 0.38 mm. The coating having a thickness of 25.4 µm was dried in an oven at 220° C. for 30 minutes followed by lamination onto steel substrate under conditions of 3.2 MPa pressure and 345° C. yielding a laminated bearing structure for evaluation by the ASTM D6862 procedure.

Example-8

A coating of composition 4, wherein coating was applied via Mayer rod to 80 vol % PTFE tape comprising 20 vol % calcium fluoride having a thickness of 0.38 mm. The coating having a thickness of 25.4 µm was dried in an oven at 220° C. for 30 minutes followed by lamination onto aluminum substrate under conditions of 3.2 MPa pressure and 345° C. yielding a laminated bearing structure for evaluation by the ASTM D6862 procedure.

Example-9

A coating of composition 4, wherein coating was applied via Mayer rod to PTFE/Polyimide tape having a thickness of 0.38 mm. The coating having a thickness of 25.4 µm was dried in an oven at 220° C. for 30 minutes followed by lamination onto steel substrate under conditions of 3.2 MPa pressure and 345° C. yielding a laminated bearing structure for evaluation by ASTM D6862 procedure.

Example-10

A coating of composition 4, wherein coating was applied via Mayer rod to PTFE/Polyimide tape having a thickness of 0.38 mm. The coating having a thickness of 25.4 µm was dried in an oven at 220° C. for 30 minutes followed by lamination onto aluminum substrate under conditions of 3.2 MPa pressure and 345° C. yielding a laminated bearing structure for evaluation by the ASTM D6862 procedure.

Example-11

A coating of composition 4, wherein coating was applied via Mayer rod to 50 vol % PTFE/50 vol % Polyphenylene Sulfide (PPS) tape having a thickness of 0.38 mm. The coating having a thickness of 25.4 µm was dried in an oven at 220° C. for 30 minutes followed by lamination onto steel substrate under conditions of 1.3 MPa pressure and 345° C. yielding a laminated bearing structure for evaluation by the ASTM D6862 procedure.

Example-12

A coating of composition 4, wherein coating was applied via Mayer rod to 50 vol % PTFE/50 vol % Polyphenylene Sulfide (PPS) tape having a thickness of 0.38 mm. The coating having a thickness of 25.4 µm was dried in an oven at 220° C. for 30 minutes followed by lamination onto aluminum substrate under conditions of 1.3 MPa pressure and 345° C. yielding a laminated bearing structure for evaluation by ASTM D6862 procedure.

Example-13

A coating of composition 5, wherein coating was applied via Mayer rod to 80 vol % PTFE tape comprising 20 vol % calcium fluoride having a thickness of 0.38 mm and coating having a thickness of 25.4 µm was dried in an oven at 220° C. for 30 minutes followed by lamination onto steel substrate under conditions of 3.2 MPa pressure and 345° C. yielded a laminated bearing structure for evaluation by the ASTM D6862 procedure.

Example-14

A coating of composition 5, wherein coating was applied via Mayer rod to 80 vol % PTFE tape comprising 20 vol % calcium fluoride having a thickness of 0.38 mm. The coating having a thickness of 25.4 μm was dried in an oven at 220° C. for 30 minutes followed by lamination onto aluminum substrate under conditions of 3.2 MPa pressure and 345° C. yielding a laminated bearing structure for evaluation by the ASTM D6862 procedure.

Example-15

A coating of composition 5, wherein coating was applied via Mayer rod to PTFE/Polyimide tape having a thickness of 0.38 mm. The coating having a thickness of 25.4 μm was dried in an oven at 220° C. for 30 minutes followed by lamination onto steel substrate under conditions of 3.2 MPa pressure and 345° C. yielding a laminated bearing structure for evaluation by the ASTM D6862 procedure.

Example-16

A coating of composition 5, wherein coating was applied via Mayer rod to PTFE/Polyimide tape having a thickness of 0.38 mm. The coating having a thickness of 25.4 μm was dried in an oven at 220° C. for 30 minutes followed by lamination onto aluminum substrate under conditions of 3.2 MPa pressure and 345° C. yielding a laminated bearing structure for evaluation by ASTM D6862 procedure.

Example-17

A coating of composition 5, wherein coating was applied via Mayer rod to 50 vol % PTFE/50 vol % Polyphenylene Sulfide tape having a thickness of 0.38 mm. The coating having a thickness of 25.4 μm was dried in an oven at 220° C. for 30 minutes followed by lamination onto steel substrate under conditions of 1.3 MPa pressure and 345° C. yielding a laminated bearing structure for evaluation by the ASTM D6862 procedure.

Example-18

A coating of composition 5 was applied via Mayer rod to 50 vol % PTFE/50 vol % Polyphenylene Sulfide (PPS) tape having a thickness of 0.38 mm. The coating having a thickness of 25.4 μm was dried in an oven at 220° C. for 30 minutes followed by lamination onto aluminum substrate under conditions of 1.3 MPa pressure and 345° C. yielding a laminated bearing structure for evaluation by the ASTM D6862 procedure.

TABLE 1

Adhesive Strength (Newton) of the coatings based on the compositions as evaluated by the ASTM D6862-11 (2016) Procedure

| Composition # | Example # of the ASTM D6862 Evaluation | Adhesive Strength (N) |
| --- | --- | --- |
| 3 | 1 | 22.0-41.3 |
| 3 | 3 | 21.5-47.6 |
| 3 | 5 | 26.2-53.0 |
| 4 | 7 | 43.5-62.2 |
| 4 | 9 | 45.8-78.7 |
| 4 | 11 | 21.6-33.0 |

TABLE 1-continued

Adhesive Strength (Newton) of the coatings based on the compositions as evaluated by the ASTM D6862-11 (2016) Procedure

| Composition # | Example # of the ASTM D6862 Evaluation | Adhesive Strength (N) |
| --- | --- | --- |
| 5 | 13 | 37.9-57.5 |
| 5 | 14 | 24.7-40.9 |
| 5 | 15 | 56.8-67.0 |
| 5 | 16 | 29.5-54.0 |

Example-19 A Bearing Structure

Figure 12:
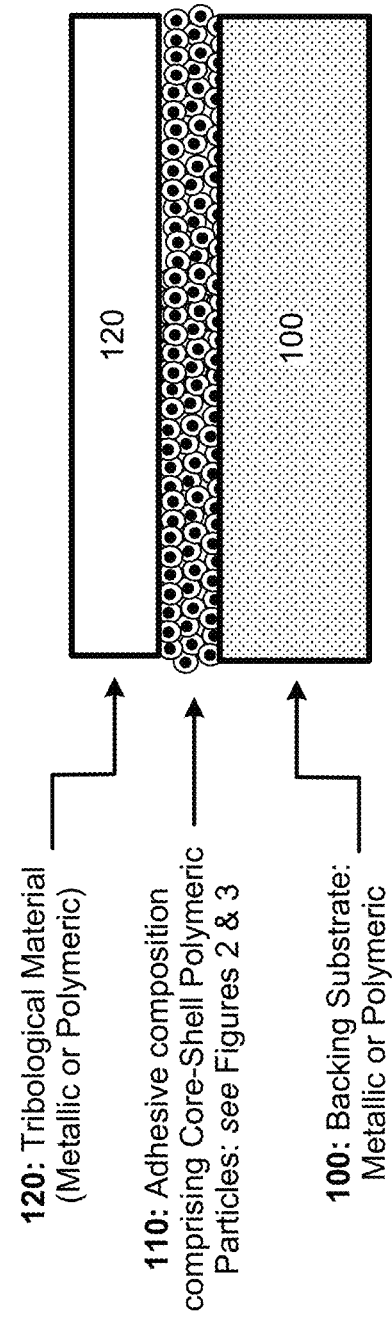
FIG. 12 illustrates a bearing structure and the adhesive materials comprising core-shell polymeric particles at the interface.
Figure 13:
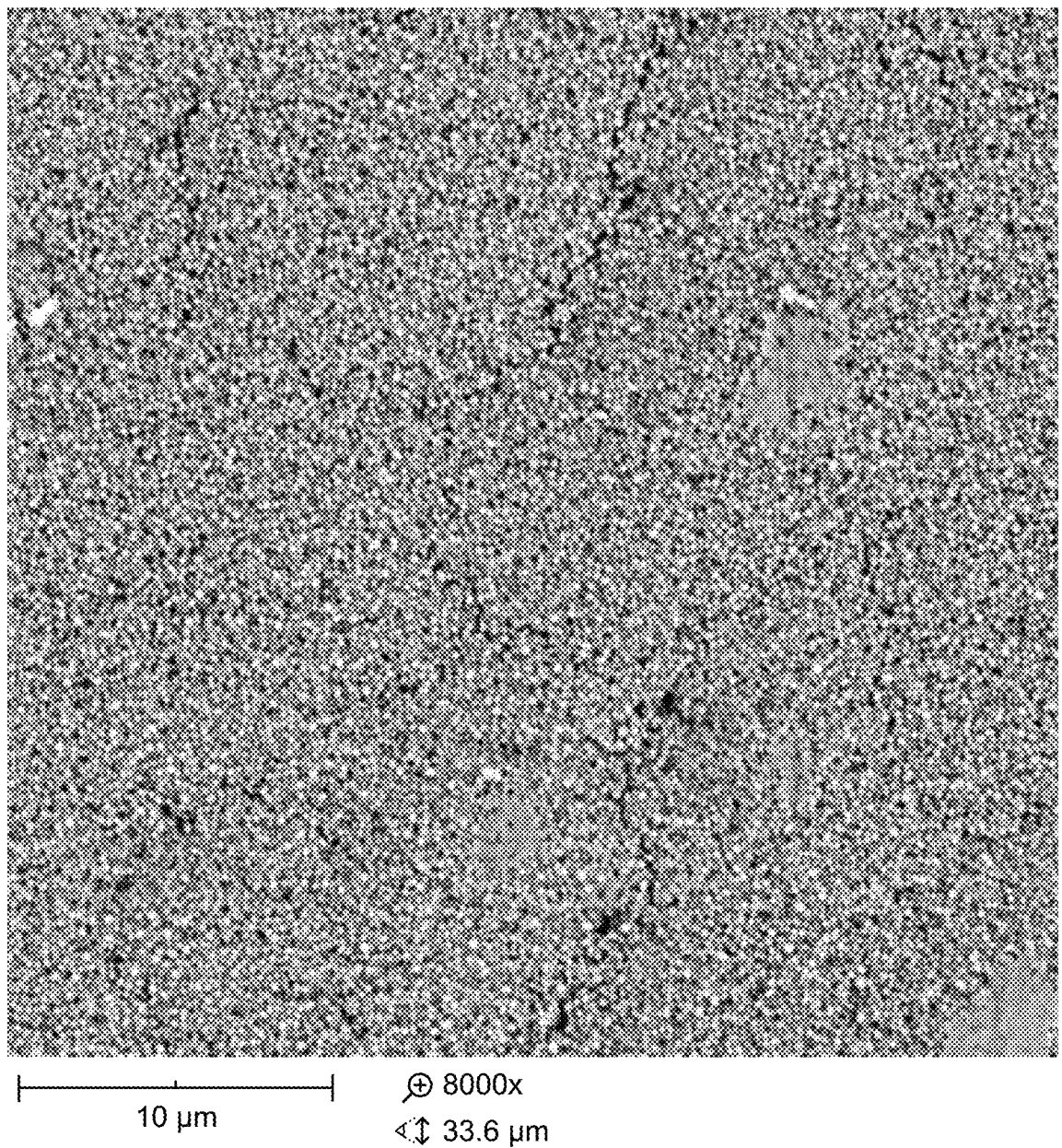
FIG. 13 depicts Scanning Electron Micrograph (SEM) of poly(DA-acetate)-PTFE core shell particles.

FIG. 12 illustrates an example of a bearing structure, depicting backing substrates (100) and tribological material (120), which can be metallic or polymeric. The backing substrate (100) and the tribological material are joined by an intermediate layer of adhesive core-shell polymeric particles (110), see FIGS. 2 and 3 for exemplary molecular structure of the polymerized materials).

The backing substrate (100) may be comprised of any suitable substrate material to which the tribological material (120) can be affixed by the intermediate layer of hot melt adhesive comprising a polydopamine polymer (110) (e.g., in the form of core-shell particle). In one embodiment, the substrate (100) is a metal backing layer of the bearing comprising a metal such as steel, aluminum, titanium, magnesium, bronze, brass, and alloys for aerospace applications, including the list of alloys and superalloys, disclosed herein. The tribological material (120) of the bearing can comprise a polymeric material such as perfluoropolymers and/or fluoropolymers selected from the group consisting of polytetrafluoroethylene (PTFE), perfluoroalkoxy alkanes (PFA) fluorinated ethylene propylene (FEP), expanded polytetrafluoroethylene (ePTFE or EPTFE), expanded fluorinated ethylene propylene (eFEP or EFEP), perfluoromethylvinylether (PMVE), perfluoro elastomers (FFKM, which are copolymers of tetrafluoroethylene and a perfluorinated ether such as PMVE), ethylene tetrafluoroethylene (ETFE), polyvinylidene fluoride (PVDF), fluoroelastomers (FKM and FEPM), vinylidene fluoride-hexafluoropropylene fluoroelastomer (VF2/HFP), vinylidene fluoride-hexafluoropropylene/tetrafluoro ethylene/hexafluoropropylene fluoroelastomer (VF2/tetrafluoro ethylene/HFP) terpolymer, or a combination thereof.

Example-20 Preparation of a Metal Polymer Plain Bearing (Journal Bearing or Slide Bearing)

Figure 16:
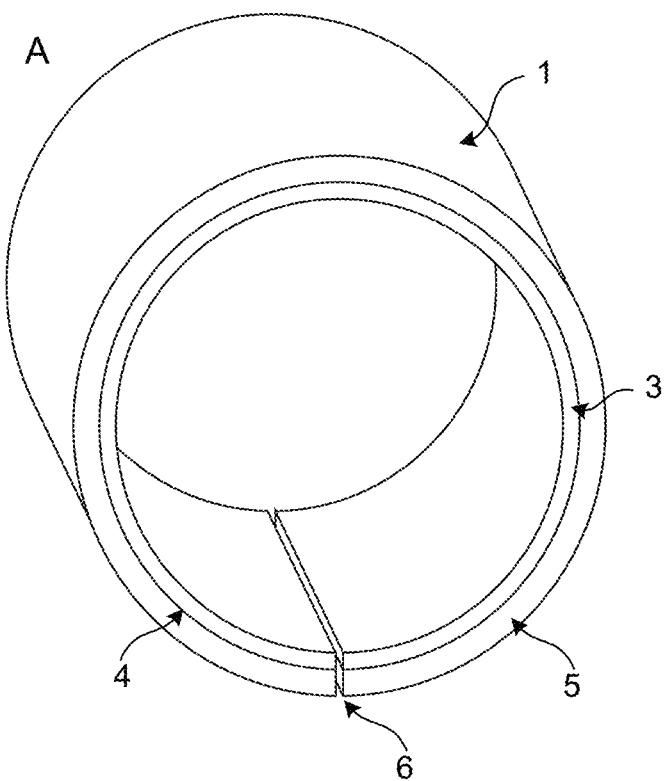
FIG. 16 depicts at A a plain bearing 1 having a polyimide (PI)/PTFE tribological layer and at B a flanged bearing 2 having a PTFE tribological layer, both bearings having steel substrates.
Figure 16:
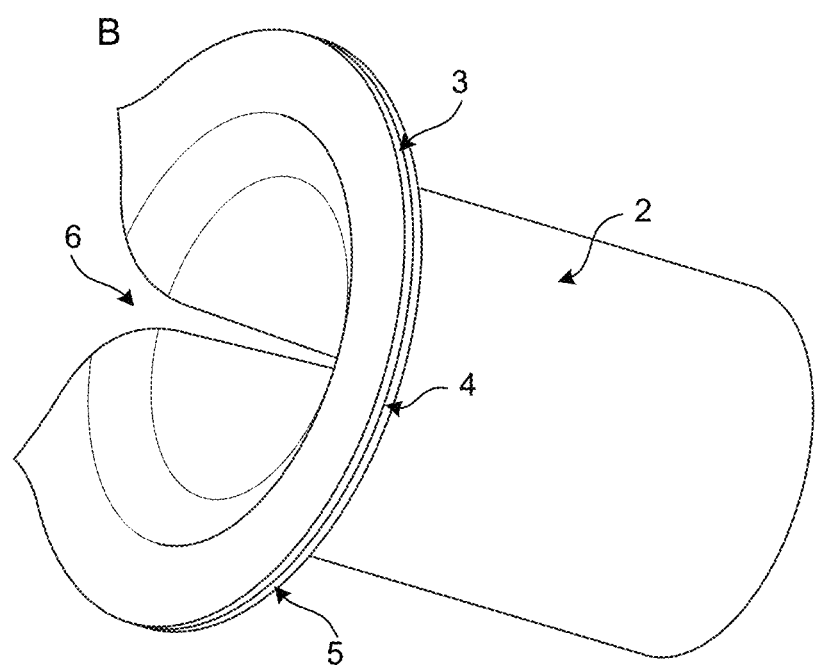

Plain bearings without a flange 1 or with a flange 2 (see FIG. 16) are prepared from a planar laminated sheet having a layer of tribological material 3 (e.g., PTFE, PI, PPS, etc.) bonded using a core shell particle fluroadhesive 4 to a substrate 5 (e.g., aluminum or steel substrate). The planar laminated sheet is prepared according to any of Examples 1-18. To form the bearings, rectangular coupons of the desired sizes are cut or punched from the laminated sheet and subjected to cold roll-forming to bring opposing edges of the coupon into proximity at 6, thereby forming single piece cylindrical bearings with or without a flange. As an alternative, two-piece bearings may be made by preparing a pair of semicircular shells using the same process (not shown).

Example-21 Dynamic Mechanical Analysis (DMA)

Synthesis Processes for the Preparation of Samples for DMA Characterization: Polydopamine Acetate Control To a 1-liter beaker is added 150 ml of 0.5M TRIS which is stirred until the TRIS salt dissolves to yield a clear solution. To this solution is added 9.0 grams of acetic acid and the entire solution is agitated to ensure complete dissolution. The pH of the solution is adjusted by the addition of increments of 1 gram of acetic acid to yield a final pH of 8.5 units. A separate solution of dopamine is then prepared by the addition of 14.2 grams of dopamine powder to a beaker that contains 150 ml of distilled water. The mixture is stirred for five minutes until the dopamine is completely dissolved. To this solution is added another 14.2 grams of dopamine salt and the mixture is stirred for 5 minutes until the dopamine salt is completely dissolved. The aqueous dopamine solution is charged to a 250 ml reservoir from which it is metered to the 1-liter beaker that contains the buffer solution at a rate of 60 ml/hr. During the reaction, the mixture is optionally sparged with air. At the end of 60 minutes and through the reaction schedule, a sample is collected at 60-minute intervals and quenched in an ice bath prior to evaluation of UV/Vis spectra. During the reaction the pH of the batch is recorded every hour and the reaction mixture is stirred at a rate of 100 rpm over the 24-hour duration of the reaction. At the end of the 24-hour reaction period, a sample of the colloidal dispersion is placed in an oven that was previously set at 220° C. At the end of the drying period (30 minutes), the sample is cooled to 25° C. and reduced to powder particles with the aid of a mortar and pestle. The dry powder particles are molded as described below for determination of DMA spectrogram. (see, FIG. 4. pDA acetate heteropolymer).

Core-Shell Particle (FluoroAdhesive)

To a 1-liter beaker is added 150 ml of distilled water. TRIS base, 18.2 grams, is added to the beaker which is stirred until the TRIS salt dissolves to yield a clear solution. To this solution is added 9.0 grams of acetic acid and the entire solution is agitated to ensure complete dissolution. The pH of the solution is adjusted by the addition of increments of 1 gram of acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 30 minutes until the dopamine salt is completely dissolved. The aqueous dopamine solution is charged to a 250 ml reservoir from which it is metered to the 1-liter beaker that contains the buffer solution at a rate of 60 ml/hr. Two hundred ml (200 ml) of a 35% solid aqueous dispersion of PTFE is delivered to the reaction vessel at 100 ml/hour. During the reaction, the pH of the batch is recorded periodically, and the reaction mixture is stirred at a rate of 100 rpm over the 24-hour duration of the reaction. At the end the process, the colloidal dispersion is sampled for drying in an oven at 220° C. At the end of the drying period (30 minutes), the sample is cooled to 25° C. and reduced to powder particles with the aid of a mortar and pestle. The dry powder particles are molded as described below for determination of DMA spectrogram (see FIG. 4. FluoroAdhesive).

DMA Characterization

The DMA was done using ASTM D4065-12 measuring conditions and the data presented in the document were derived from measurements of the transitions associated with the movements of the polymer chains under conditions that induce thermal and mechanical stresses. The measurement technique defined as Dynamic Mechanical Analysis (DMA) records the resonant frequency and mechanical damping of a strip of polymeric material constrained to flex at a rate of 1 Hz. The test samples were prepared by compression molding of granulated powder particles of the samples exemplified in the examples. The mold is in the form of a hollow stainless-steel parallelepiped cavity of dimension: length=3.81 cm and area of base: 0.4 $cm^2$ and curved edges of 0.2 cm radius. A lid, of the same shape as the cavity is inserted into the upper surface of the cavity for the purpose of compressing the material inserted into the hollow cavity. For the preparation of a molded test piece, a copper plate is placed under the lower surface of the mold which is then filled with an excess of the powder particles prepared from the sample. The lid is then inserted above the cavity and the mold is placed in a Carver Press which is maintained at a temperature of 345° C. This is followed by the application of 1000 pound force of pressure for a duration of five minutes.

The data recorded from this measurement quantifies, by known mechanical damping, the amount of energy dissipated by the sample as it oscillates, while the resonant frequency yields the value of the Youngs Modulus (elastic) or stiffness. From the DMA measurements, the loss modulus and storage modulus are recorded. The ratio of loss modulus to storage modulus (or elastic modulus) is expressed as tan(δ). Tan(δ) is a measurement of the glass transition temperature of the core-shell polymer.

The DMA data reveal the influence that the shell polymer has on the thermal properties of the core-shell polymer particle composite. In the case of the esterified dopamine copolymer—PTFE system, the recorded data shows that the PTFE, which forms the core of the composite is significantly enhanced in elastic modulus by apparent covalent coupling with the poly(esterified dopamine) copolymer.

Example-22 Adhesion to Etched and Non-Etched Fluoropolymers

The ability of the hot-melt pressure sensitive adhesive core of the present disclosure comprising particles with a shell of dopamine monomers polymerized in the presence of a carboxylic acid on a thermoplastic (PTFE) core to bond to a non-etched fluoropolymer was tested. The strength of the adhesive bond between a sheet of non-etched fluoropolymer and a metal substrate was compared to the bond achieved by lamination of a comparable etched fluoropolymer (etched PTFE) sheet to the same type of metal substrate. For the test a 254 μm thick commercially available PTFE sample film etched by exposure to sodium in liquid ammonia and a 254 μm thick PTFE sample film (virgin Skived PTFE etched Style 8536) obtained from Technetics Group were employed. The etched film samples were laminated onto their steel substrates under conditions of 1.7 MPa pressure and 345° C. yielding a laminated composite structure for evaluation by the ASTM D6862-11 (2016) procedure.

Samples of virgin non-etched PTFE film were coated with core-shell adhesive prepared as described below. The non-etched PTFE films were laminated onto steel substrates under 1.7 MPa pressure at 345° C. yielding a laminated composite structure for evaluation by the ASTM D6862-11 (2016) procedure. The data are listed in Table 2.

i. Preparation of the Adhesive, Coating of Non-Etched PTFE Samples, and Lamination on to Substrates Distilled water was added to one-liter beakers to prepare TRIS acetate buffers of pH 8.5 or 9.0. TRIS, 36.4 grams, was added to each beaker which was stirred until the TRIS salt dissolves to yield a clear solution. To this solution was added about 18.0 ml or 7.0 ml of 25% acetic acid and the entire mixture was agitated (stirred) to ensure complete dissolution. The pH of the solution was adjusted by the incremental addition of 1 gram of 25% acetic acid to yield a TRIS acetate buffers with a final pH of 8.5 or 9.0. Two separate solutions of dopamine were prepared by the addition of 28.4 grams of dopamine to 300 ml aliquots of distilled water, and the mixtures were stirred for five minutes until the dopamine was completely dissolved. The aqueous dopamine solutions were charged into 500 ml reservoirs from which each was metered into one of the one-liter beakers containing the pH 8.5 or pH 9.0 TRIS acetate buffers at a rate of 95 ml/hr. Simultaneously, aqueous dispersions/suspensions of PTFE particles (400 mls each of a 35% weight of PTFE particles to volume) about 0.25 μm in average diameter were metered into each of the beakers containing the TRIS acetate buffers at 100 ml/hour. The PTFE particles (Teflon™ PTFE DISP 35, particle size with average diameter of about 0.245 μm) obtained from The Chemours Company FC, LLC. During the reactions, the pH of the batch was recorded periodically. The reaction mixture continued to be stirred at a rate of 100 rpm for 24-hours. At the end of the process, the colloidal dispersions were sampled for coating onto a PTFE substrate. Uniform coatings on the non-etched PTFE were obtained from the solution. The coating composition were applied via Mayer rods to form a 38 μm thick coating on the non-etched PTFE film samples. The coatings were subsequently dried in an oven at 220° C. for 30 minutes. After drying, the adhesive coated non-etched PTFE film samples were laminated onto steel substrates under 3.2 MPa pressure at 345° C. to yield laminated composite structures for evaluation by ASTM D6862-11 (2016) as described below.

ii. ASTM D6862-11 Resistance-to-Peel Assessment

Samples of the etched and non-etched PTFE films were subject to measurement of their peel resistance using the protocol described in ASTM D6862-11 (2016). The data indicates that the adhesive bonding of the hot melt core-shell adhesives prepared at pH 8.5 or 9.0 to non-etched fluoropolymers (e.g., PTFE) is at least equivalent, if not superior, to the bonding of etched fluoropolymers (e.g., etched PTFE) to metal (e.g., steel substrates). The unexpected ability of the hot-melt adhesive to bind to non-etched fluoropolymers indicates that etching is unnecessary in the creation of fluoropolymer (PTFE) composites when using the hot-melt adhesives described herein. The ability to bind non-etched fluoropolymers such as PTFE to various substrates results in savings in the cost and number of processing steps required for fluoropolymer preparation, and in addition a reduction in the chemical waste associated with the etching process.

TABLE 2

| Adhesive Composition formed in: | Sheet Thickness | Width | Strength N | Etched |
|---|---|---|---|---|
| -- No adhesive-- | 254 μm | 25.4 mm | 17.8 | Yes |
| -- No adhesive-- | 254 μm | 25.4 mm | 20.4 | Yes |
| TRIS Acetate pH 8.5 | 254 μm | 25.4 mm | 17.0 | No |
| TRIS Acetate pH 8.5 | 254 μm | 25.4 mm | 14.6 | No |
| TRIS Acetate pH 8.5 | 254 μm | 25.4 mm | 19.2 | No |
| TRIS Acetate pH 8.5 | 254 μm | 25.4 mm | 22.2 | No |
| TRIS Acetate pH 8.5 | 254 μm | 25.4 mm | 42.6 | No |

TABLE 2-continued

| Adhesive Composition formed in: | Sheet Thickness | Width | Strength N | Etched |
|---|---|---|---|---|
| TRIS Acetate pH 8.5 | 254 μm | 25.4 mm | 36.2 | No |
| TRIS Acetate pH 8.5 | 254 μm | 25.4 mm | 26.0 | No |
| TRIS Acetate pH 8.5 | 254 μm | 25.4 mm | 19.4 | No |
| TRIS Acetate pH 8.5 | 254 μm | 25.4 mm | 22.2 | No |
| TRIS Acetate pH 8.5 | 254 μm | 25.4 mm | 19.6 | No |
| TRIS Acetate pH 8.5 | 254 μm | 25.4 mm | 13.8 | No |
| TRIS Acetate pH 8.5 | 254 μm | 25.4 mm | 33.8 | No |
| TRIS Acetate pH 8.5 | 254 μm | 25.4 mm | 13.8 | No |
| TRIS Acetate pH 8.5 | 254 μm | 25.4 mm | 30.0 | No |
| TRIS Acetate pH 8.5 | 254 μm | 25.4 mm | 29.2 | No |
| TRIS Acetate pH 9.0 | 254 μm | 25.4 mm | 12.0 | No |
| TRIS Acetate pH 9.0 | 254 μm | 25.4 mm | 17.8 | No |
| TRIS Acetate pH 9.0 | 254 μm | 25.4 mm | 11.0 | No |
| TRIS Acetate pH 9.0 | 254 μm | 25.4 mm | 20.4 | No |
| TRIS Acetate pH 9.0 | 254 μm | 25.4 mm | 13.0 | No |
| TRIS Acetate pH 9.0 | 254 μm | 25.4 mm | 12.8 | No |
| TRIS Acetate pH 9.0 | 254 μm | 25.4 mm | 12.2 | No |
| TRIS Acetate pH 9.0 | 254 μm | 25.4 mm | 15.4 | No |
| TRIS Acetate pH 9.0 | 254 μm | 25.4 mm | 14.4 | No |
| TRIS Acetate pH 9.0 | 254 μm | 25.4 mm | 16.4 | No |
| TRIS Acetate pH 9.0 | 254 μm | 25.4 mm | 16.8 | No |
| TRIS Acetate pH 9.0 | 254 μm | 25.4 mm | 19.0 | No |
| TRIS Acetate pH 9.0 | 254 μm | 25.4 mm | 15.8 | No |
| TRIS Acetate pH 9.0 | 254 μm | 25.4 mm | 39.8 | No |

What is claimed is:

1. A method of forming a mechanical bearing or a bearing component comprising a substrate bonded to a tribological material by an adhesive comprising hot-melt pressure-sensitive core-shell polymeric particles wherein the hot-melt pressure-sensitive core-shell polymeric particles comprise a core and a shell, the method comprising:
    a) applying a composition comprising the hot-melt pressure-sensitive core-shell particles to the tribological material to provide a coated tribological material;
    b) heating the coated tribological-material to a temperature of about 150° C. to about 220° C.;
    c) contacting the substrate with the tribological material at a point where the composition has been applied to provide a laminated structure; and
    d) heating the laminated structure comprising the substrate and the coated tribological material to a temperature of about 345° C. to about 360° C. under 0.1 Pa to 32 MPa pressure.

2. The method of forming the mechanical bearing of claim 1, wherein the core is a polymeric particle comprised of one or more fluoropolymers or perfluoropolymers, wherein the core comprises polytetrafluoroethylene (PTFE) and wherein the shell comprises from 2% to 100% of polydopamine polymer on a dry weight basis.

3. The method of forming the mechanical bearing of claim 1, wherein the shell comprises a thermoplastic polydopamine polymer comprised of dopamine and/or dopamine analog monomers polymerized to form the polydopamine polymer with one or more carboxylic acids esterified to the polydopamine polymer, wherein each of the one or more carboxylic acids esterified to the polydopamine polymer is selected independently from the group consisting of: formic, acetic and propanoic acid.

4. The method of forming the mechanical bearing of claim 1, wherein the substrate and/or the tribological material have not been chemically or plasma etched where the composition comprising the hot-melt pressure-sensitive core-shell polymeric particles has been applied.

5. The method of forming the mechanical bearing of claim 1, wherein the tribological material is comprised of a thermoplastic, FEP, PTFE, fluoropolymer or perfluoropolymer.

6. The method of forming the mechanical bearing of claim 1, wherein the substrate or tribological material is substantially in the form of a tube, cylinder, cylindrical bushing, film, sheet, or ribbon, and the composition comprising the hot-melt pressure-sensitive core shell polymeric particles is applied to all or part of one surface of the tube, cylinder, cylindrical bushing, film, sheet, or ribbon.

7. The method of forming the mechanical bearing of claim 1, wherein the substrate is comprised of a metal, metal alloy, ceramic, and/or glass.

* * * * *